(12) United States Patent
Li et al.

(10) Patent No.: US 7,062,099 B2
(45) Date of Patent: Jun. 13, 2006

(54) IMAGE PROCESSING METHOD AND APPARATUS USING SELF-ADAPTIVE BINARIZATION

(75) Inventors: Yulin Li, Beijing (CN); Jie Wang, Beijing (CN); Hongsheng Zhao, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 752 days.

(21) Appl. No.: 10/194,263

(22) Filed: Jul. 15, 2002

(65) Prior Publication Data

US 2003/0031366 A1 Feb. 13, 2003

(30) Foreign Application Priority Data

Jul. 31, 2001 (CN) .............................. 01 1 24473

(51) Int. Cl.
*G06K 9/36* (2006.01)
*G03F 3/08* (2006.01)

(52) U.S. Cl. ..................... 382/237; 382/171; 382/199; 358/521

(58) Field of Classification Search ............... 382/266, 382/269, 273, 274, 270, 252, 190, 197, 205, 382/237, 171–173, 199; 358/455, 464–466, 358/3.04, 1.15, 3.13, 521
See application file for complete search history.

(56) References Cited

U.S. PATENT DOCUMENTS

| | | | | |
|---|---|---|---|---|
| 4,654,721 A | * | 3/1987 | Goertzel et al. | 358/3.04 |
| 4,823,194 A | * | 4/1989 | Mishima et al. | 382/190 |
| 5,046,118 A | * | 9/1991 | Ajewole et al. | 382/169 |
| 5,233,670 A | * | 8/1993 | Dufour et al. | 382/197 |
| 5,268,967 A | * | 12/1993 | Jang et al. | 382/132 |
| 5,583,659 A | * | 12/1996 | Lee et al. | 358/3.13 |
| 6,289,126 B1 | * | 9/2001 | Ishisaka | 382/205 |
| 6,333,788 B1 | * | 12/2001 | Yamada et al. | 358/1.15 |
| 6,347,156 B1 | * | 2/2002 | Kamada et al. | 382/237 |
| 6,351,566 B1 | * | 2/2002 | Zlotnick | 382/237 |

FOREIGN PATENT DOCUMENTS

JP 9-233326 9/1997

OTHER PUBLICATIONS

N. Otsu, "A Threshold Selection Method from Gray-Level Histograms", IEEE Transactions On Systems, Man, And Cybernetics, vol. SMC-9, No. 1, pp. 62-66, Jan. 1979.
J. Kitler, et al., "Minimum Error Thresholding", Pattern Recognition, vol. 1, pp. 41-47, 1986.

(Continued)

*Primary Examiner*—Kanjibhai Patel
(74) *Attorney, Agent, or Firm*—Fitzpatrick, Cella, Harper & Scinto

(57) ABSTRACT

The present invention provides a unique method, apparatus, system and storage medium for image binarization process, wherein an image to be processed is divided into a plurality of sub-images and an binarization threshold for each of the sub-images is determined based on the gray-levels of the edge pixels detected in respective sub-image. The image processing method of the present invention comprises: calculating a gray-level statistical distribution of pixels of an image, detecting edge pixels in an image based on an edge criterion corresponding to the gray-level statistical distribution, dividing the image into a plurality of sub-images; determining a binarization threshold for each of the sub-images based on the gray-levels of edge pixels detected in the sub-image; and performing binarization process for each of the sub-images based on the binarization threshold of the sub-image.

33 Claims, 18 Drawing Sheets

OTHER PUBLICATIONS

W. Tsai, "Moment-Preserving Thresholding: A New Approach", Computer Vision, Graphics, and Image Processing 29, pp. 377-393, 1985.

O.D. Trier, et al., "Goal-Directed Evaluation of Binarization Methods", IEEE Transactions on Pattern Analysis and Machine Intelligence, vol. 17, No. 12, pp. 1191-1201, Dec. 1995.

"Image Analysis", Section 3.6.2, by Wang, Runsbeng, and English translation.

* cited by examiner

IMAGE PROCESSING METHOD AND APPARATUS USING SELF-ADAPTIVE BINARIZATION

FIELD OF THE INVENTION

The present invention relates to an image processing method and apparatus using self-adaptive binarization.

BACKGROUND OF THE INVENTION

1. Technical Field

In recent years, image processing technologies have been greatly developed, and image-processing apparatus for remote-sensing image processing, color image processing and file image optical character recognition (OCR) etc. have gained wide applications.

2. Background Art

In these image processing technologies, gray-level image binarization process is an indispensable. A binarization process is a process for converting a color image or a gray-level image into a black-white image, wherein such a black-white image has only two gray-levels.

Conventionally-used binarizing methods are well-known, such as a binarizing method by simply providing a preset threshold for the entire image to be binarized, a binarizing method using Otsu maximum inter-category square difference method for calculating a threshold based on a gray-level histogram (see "A Threshold Selection Method from Gray-Level Histograms", IEEE Trans. On systems, Man, and cybernetics, Vol. SMC-9, No. 1, pp. 62–66, January 1979); Kittler and Illingworth's minimum error method (see "Minimum Error Thresholding" Pattern Recognition. Vol. 19, No. 1, pp. 41–47, 1986); and Tsai's moment preserving method (see "Moment-Preserving thresholding: A New Approach", Computer Vision, Graphics, and Image Processing 29, pp. 377–393, 1985), etc.

However, binarizing methods using a single threshold for an entire image often have their defects. For example, at the time of performing OCR process on a file image, and at the time of performing binarizing process on a file image of characters, tables, and pictures having various gray-levels, it is very difficult to completely preserve the characters, tables, and pictures using a single threshold.

So methods have been used that divide an image into a plurality of non-overlapping sub-images, calculate a gray-level histogram for each of the sub-images so as to determine a corresponding threshold for each of the sub-images, and then perform binarization process. For example, Japanese Patent Laid-open 9-233326 describes a binarizing method, which divides an image into sub-images each having 64×64 pixels, calculates a threshold of one of the sub-images using the gray-level histogram of the sub-image, and performing a smoothing process for each pixels in the sub-image using interpolation, and finally performing binarization process for each of the pixels.

In table image recognition systems, such as note processing systems used in banks, it is necessary to perform binarization process on the input gray-level images to convert them into binarized images (black-white images), perform a match-discrimination process for table images based on the outer frames, sizes, and relative positions of the tables, determine the sequence of the tables as registered in the system, determine the areas to be recognized, and carry OCR process over the areas to be recognized. Obviously, binarization process is a very important process, and if the frame of a table is lost or is not clear, the match-discrimination process may be led to failure; if noise in the areas to be recognized is too great, the accuracy of OCR will be seriously affected. As the outer frames in images of tables are different in their thickness and background patterns or patterns left by carbon paper often exist in the area to be recognized, conventional binarization methods often show poor results when they are used in processing images of tables.

SUMMARY OF THE INVENTION

An object of the present invention is to provide an image processing method, an image processing apparatus, and a storage medium for the image processing method for realizing a fast and effective binarization process on an image based on the characteristics of the image.

A more specific object of the present invention is to provide an image processing method, an image processing apparatus, and a storage medium for the image processing method for realizing a fast and effective binarization process on an image based on the characteristics of the image while preserving as much as possible the outer frames of tables and blocks of inverted characters.

The present invention provides a unique solution, in which an image to be processed is divided into a plurality of sub-images, and a binarizing threshold is determined for each of the sub-images based on the gray-levels of edge-pixels detected in the sub-image.

In accordance with the present invention, the above-mentioned objects are realized by providing an image processing method for processing an image with a gray-level distribution of pixels. The method is characterized in that it comprises the steps of:

a) calculating a statistical distribution of the gray-level of the pixels of said image;

b) detecting edge pixels in the image in accordance with an edge criterion corresponding with the statistical distribution of gray-level;

c) dividing said image into a plurality of sub-images;

d) determining a binarizing threshold for each of the sub-images in accordance with the gray-levels of the edge pixels detected in the same sub-image;

e) binarizing each of the sub-images in accordance with the binarizing threshold determined for the same sub-image.

In a more specific aspect, the image processing method of the present invention further comprises the step of:

determining a global minimum threshold for said image, said global minimum threshold prevents the ratio of the number of pixels with gray-levels lower than said global minimum threshold to the total number of pixels in the image from becoming lower than a preset value;

wherein the step of determining a binarizing threshold for each sub-image comprises:

determining a candidate binarizing threshold of a current sub-image in accordance with the average gray-level of the edge pixels detected in the current sub-image;

comparing said global minimum threshold with a second candidate binarizing threshold determined based on said candidate binarizing threshold of the current sub-image; and determining the binarizing threshold of the current sub-image on the basis of the result of said comparing step.

In a more specific aspect, the image processing method of the present invention further comprises the step of detecting black block in the image.

In a more specific aspect, the image processing method of the present invention is characterized in that in the global minimum threshold determining step: if a black block is detected in said black block detecting step, said global minimum threshold is determined in accordance with a reference threshold of said black block; and if no black block is detected in said black block detecting step, said global minimum threshold is determined on the basis of said gray-level statistical distribution.

In a more specific aspect, the image processing method further comprises:

determining said global minimum threshold on the basis of the positions of peaks and valleys in said gray-level statistical distribution.

Moreover, the above objects of the present invention are realized by providing an image processing apparatus for processing an image having a gray-level distribution, characterized in that the apparatus comprises:

a) a gray-level distribution calculating means for calculating a statistical distribution of the gray-level of the pixels of said image;

b) an edge pixel detecting means for detecting edge pixels in the image in accordance with an edge criterion corresponding with the statistical distribution of gray-level;

c) an image dividing means for dividing said image into a plurality of sub-images;

d) a sub-image binarizing threshold determining means for determining a binarizing threshold for each of the sub-images in accordance with the gray-levels of the edge pixels detected in the same sub-image;

e) a binarizing means for binarizing each of the sub-images in accordance with the binarizing threshold determined for the same sub-image.

In a more specific aspect, the image processing apparatus of the present invention is characterized in that it further comprises:

a global minimum threshold determining means for determining a global minimum threshold for said image, said global minimum threshold prevents the ratio of the number of pixels with gray-levels lower than said global minimum threshold to the total number of pixels in the image from becoming lower than a preset value;

wherein said sub-image binarizing threshold determining means determines a candidate binarizing threshold of a current sub-image in accordance with the average gray-level of the edge pixels detected in the current sub-image;

compares said global minimum threshold with a second candidate binarizing threshold determined based on said candidate binarizing threshold of the current sub-image; and determines the binarizing threshold of the current sub-image on the basis of the result of said comparing.

In a more specific aspect, the image processing method of the present invention is characterized in that it further comprises the step for detecting black block in the image.

In a more specific aspect, the image processing method of the present invention is characterized in that in the global minimum threshold determining means determines said global minimum threshold in accordance with a reference threshold of said black block when a black block is detected by said black block detecting step and determines said global minimum threshold on the basis of said gray-level statistical distribution when no black block is detected in said black block detecting step.

Further, the above objects are realized by providing an image processing system, wherein the system comprises:

an input device for inputting an image;

an image processing apparatus for processing an image having a gray-level distribution, wherein the apparatus comprises:

a) a gray-level distribution calculating means for calculating a statistical distribution of the gray-level of the pixels of said image;

b) an edge pixel detecting means for detecting edge pixels in the image in accordance with an edge criterion corresponding with the statistical distribution of gray-level;

c) an image dividing means for dividing said image into a plurality of sub-images;

d) a sub-image binarizing threshold determining means for determining a binarizing threshold for each of the sub-images in accordance with the gray-levels of the edge pixels detected in the same sub-image;

e) a binarizing means for binarizing each of the sub-images in accordance with the binarizing threshold determined for the same sub-image.

Still further, the present invention provides a storing medium for storing program codes, wherein the program codes comprise:

code for calculating a statistical distribution of the gray-level of the pixels of said image;

code for detecting edge pixels in the image in accordance with an edge criterion corresponding with the statistical distribution of gray-level;

code for dividing said image into a plurality of sub-images;

code for determining a binarizing threshold for each of the sub-images in accordance with the gray-levels of the edge pixels detected in the same sub-image;

code for binarizing each of the sub-image in accordance with the binarizing threshold determined for the same sub-image.

Other features and advantages of the present invention will become apparent from the description of embodiments given below and the attached drawings, in which same or similar parts or steps are indicated by the same reference numbers.

BRIEF DESCRIPTION OF THE DRAWINGS

The attached drawings, which constitute a part of the description, are used to describe the embodiments of the present invention along with the specification of the present application.

FIG. 8C shows the result of image binarization performed on the original image shown in FIG. 8A in accordance with the embodiment as shown in FIG. 1.

FIG. 8D-A shows an enlarged portion of the edge image shown in FIG. 8D;

FIG. 8E shows an edge image obtained by performing the original image shown in FIG. 8A using the edge determining method of the present invention;

FIG. 8E-A shows an enlarged portion of the edge image shown in FIG. 8E;

DETAILED DESCRIPTION OF PREFERRED EMBODIMENTS

First Embodiment

System Structure

Figure 1:
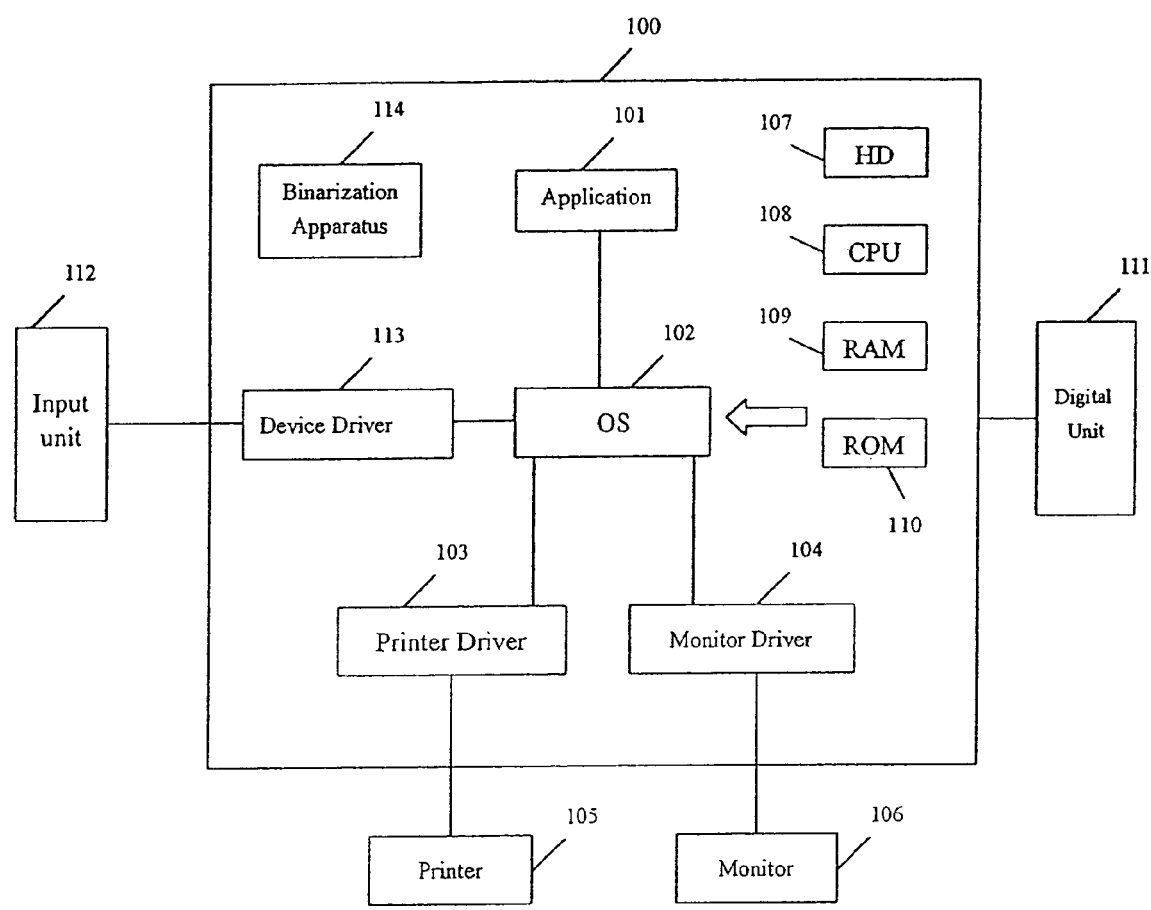
FIG. 1 is a structural block diagram of an image binarization processing system according to an embodiment of the present invention.

FIG. 1 is a structural block diagram of an image binarization processing system according to an embodiment of the present invention.

As shown in FIG. 1, a printer 105, such as an ink jet printer and the like, and a monitor 106 are connected with a host computer 100.

The host computer 100 has an application program 101, such as a word processing program, a scaling program, an Internet browser and the like, an OS (operating system) 102, a printer driver program 103 for processing various drawing commands (image drawing command, letter drawing command, graphics drawing command) indicating output images, which are issued by the application program 101 to the OS 102, and generating printing data, and a monitor driver 104 for processing various drawing commands issued by the application program 101 and displaying data on the monitor 106.

Reference number 112 denotes an instruction inputting device, and 113 denotes its device driver. For example, a mouse is connected, which points various information displayed on the monitor 106 to issue various instructions to the OS 102. It is to be noted that other pointing devices may be used in place of a mouse, such as a tracking ball, a pen, a touch panel, a keyboard and the like.

The host computer 100 comprises, as various hardware that can run these programs, a CPU (central processing unit) 108, a hard disk (HD) 107, a random access memory (RAM) 109, a read-only memory (ROM) 110, and the like.

As an example of the table image binarization system shown in FIG. 1, Windows 98 available from Microsoft Corp., is installed as an OS in a PC-AT compatible personal computer available from IBM Corp., application programs necessary for implementing printing are installed, and a monitor and a printer are connected to the personal computer.

In the host computer 100, each application 101 generates data of output images using text data such as characters and the like classified into text, graphic data such as figures and the like classified into graphic data, and image data classified into natural image and the like, etc. When the printer prints out image data, the application 101 issues a printing request to the OS 102. At this time, the application 101 sends out a group of drawing commands to OS 102, which includes a graphic drawing command corresponding to graphic data and an image drawing command corresponding to image data.

After OS 102 receives the print out request from the application 101, it issues a drawing command group to the printer driver 103 corresponding to a printer. The printer driver 103 processes the printing request and drawing command group from the OS 102, produces printing data which the printer 105 can print out, and transfers the printing data to the printer 105. If the printer 105 is a rasterizing printer, the printer driver 103 performs an image correction process for the drawing commands from OS 102 and then rasterizes the commands sequentially on a RGB 24-bit page memory. Upon completion of rasterization of all the drawing commands, the printer driver 103 converts the contents of the RGB 24-bit page memory into a data format that the printer 105 can print out, e.g., CMYK data, and transfers the converted data to the printer 105.

The host computer 100 may be connected with an image scanner 111, which senses an image of an original and generates RGB image data and can load and store the sensed image data in the HD 107. The image data sensed by the image scanner 111 is encoded by BMP. The sensed image data can be transferred as image data to the printer 105 after it is decoded by the printer driver 103.

The host computer 100 further comprises a table image binarization apparatus 114 for detecting edges in a table image. The image data stored in HD 107 is read out and processed by the table image binarization apparatus 114. First, a table image edge is binarized. Then, under the control of OS 102, a binarized image of the table image is outputted by the printer 105 or the monitor 106.

Table Image Binarization Apparatus

Figure 2:
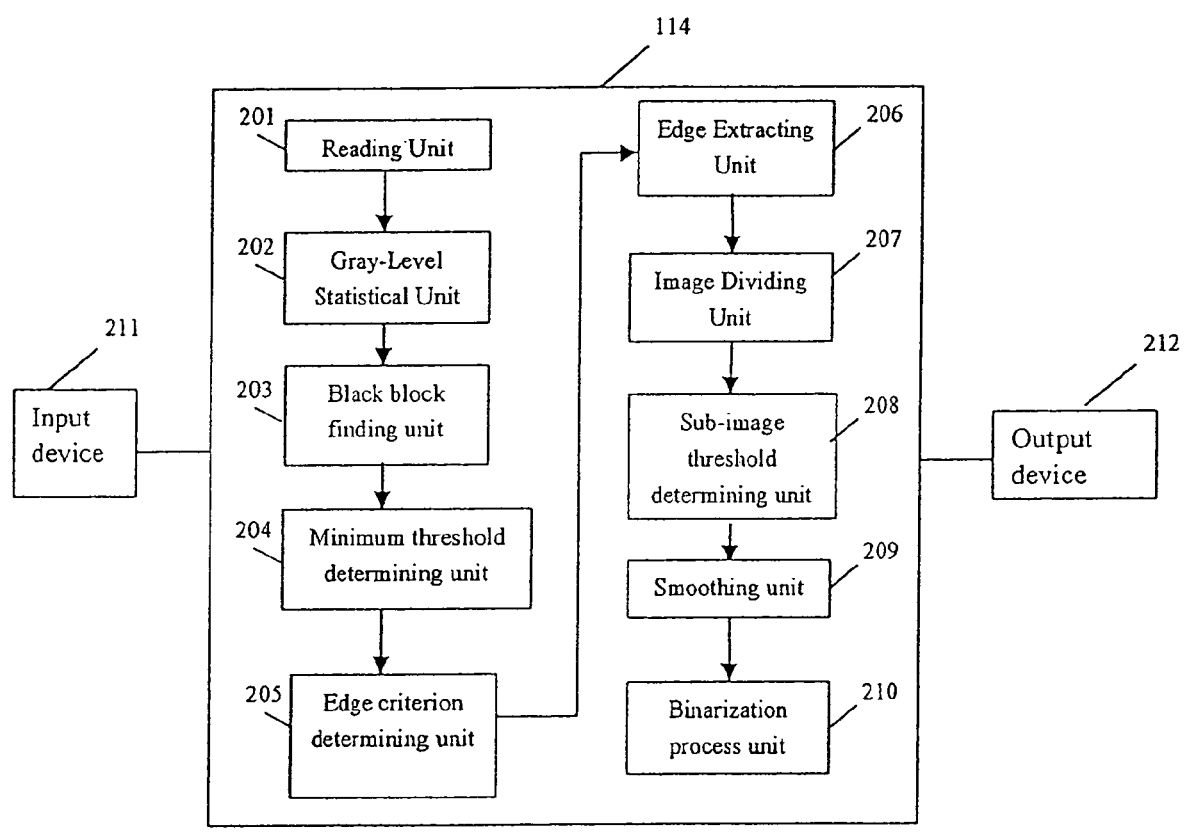
FIG. 2 is a structural block diagram of the image binarization processing apparatus in the embodiment as shown in FIG. 1.

FIG. 2 is a structural block diagram of the image binarization processing apparatus in the embodiment as shown in FIG. 1.

A table image binarization apparatus 114 of the present embodiment comprises an image reading unit 201, an image gray-level statistical unit 202, a black block finding unit 203, a minimum threshold determining unit 204, an edge criterion determining unit 205, an edge extracting unit 206, an image dividing unit 207, a sub-image threshold determining unit 208, a smoothing unit 209 and a binarization processing unit 210.

An image input device, such as a scanner, photo-electrically reads an inputting original image from an original. The analog signal indicating the original image is converted into a digital image signal. The digital image signal is stored in a storage device such as the HD 107 or ROM 110 or the like.

In the table image binarization apparatus 114, the image reading unit 201 first reads the digital image signal stored in the storage device, such as ROM 110 or the like, and supplies the read image signal to the image gray-level statistical unit 202.

The image gray-level statistical unit 202 converts various images, such as color images, Tiff images, etc., which are read by the reading unit 201, into gray-level images and calculates a gray-level histogram of the frequency of occurrence of pixels of different gray-levels.

The black block finding unit 203 finds black blocks in the original image, for example, based on gray-level histogram calculated by the image gray-level statistical unit 202, as will be explained below.

The minimum threshold determining unit 204 determines a global minimum threshold for the image, which ensures that the ratio of the number of pixels with each having a gray-level lower than the minimum threshold in the image to the total number of pixels in the image is not lower than a preset value, as will be explained below.

The edge criterion determining unit 205 analyzes the original image based on the calculated gray-level statistical distribution, divides the original image into a foreground and a background based on the result of the analysis, and determines the edge criterion based on the sum of the gray-levels of the pixels in the foreground and the sum of the gray-levels of the pixels in the background, as will be explained below.

The image edge extracting unit 206, based on the image edge criterion determined by the edge criterion determining unit 205, determines whether each of the pixels of an image is an edge pixel, and the image dividing unit 207 divides the image to be detected into a plurality of sub-images based on the determined image edge pixels.

The sub-image threshold determining unit 208 determines a binarization threshold of the sub-image based on the gray-level of each of the edge pixels detected in each of the sub-images.

The smoothing unit 209 performs a two-dimensional interpolation for pixels in the current sub-image and its neighboring sub-images using the binarization threshold of each of the sub-images.

The binarization processing unit 210 performs a binarization process for the current sub-image based on the binarization threshold of each of the sub-images.

Table Image Binarization Process

Figure 3:
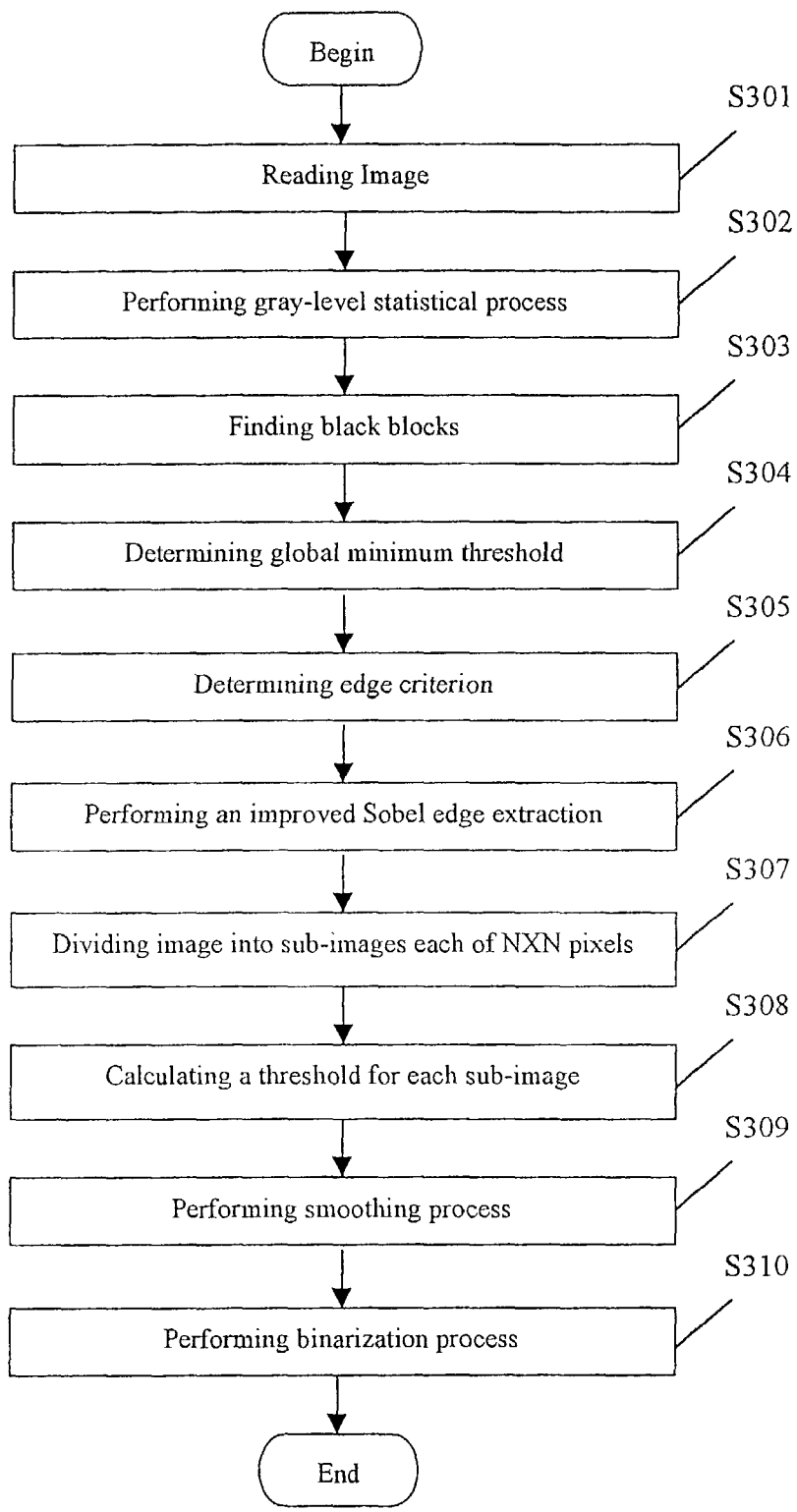
FIG. 3 is a flowchart showing an image binarization processing procedure in the embodiment as shown in FIG. 1.

FIG. 3 is a flowchart showing an image binarization processing procedure in the embodiment as shown in FIG. 1. Table binarization process will be described in detail with reference to FIGS. 3 and 8A.

Figure 8A:
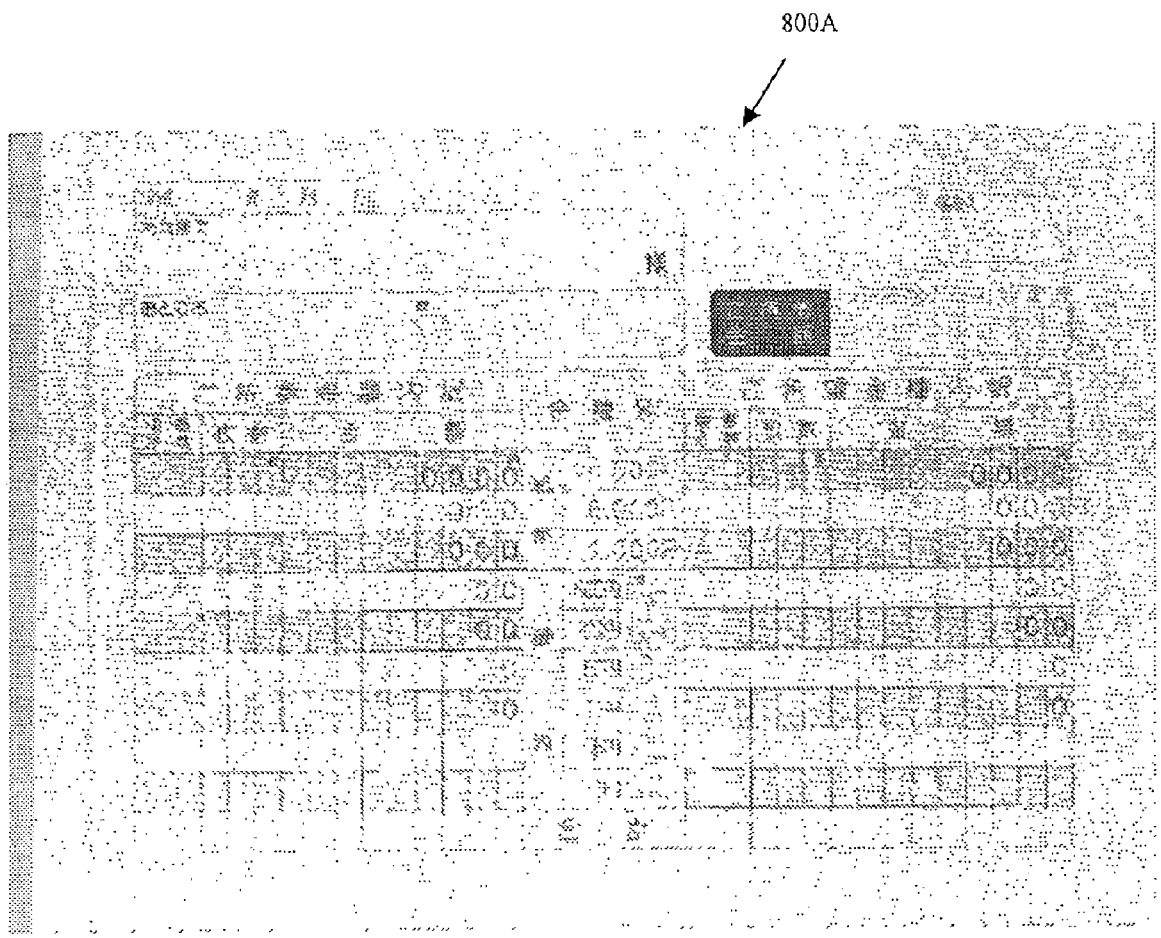
FIG. 8A shows an example of original image over which image binarization is to be performed.

FIG. 8A shows an exemplary original image to be subject to binarization process, which is an image of a bank note. The multi-level image is read by an image input device such as a scanner, a digital camera and etc. and is stored in a predetermined location of a storage device such as ROM 110, HD 107 or RAM 109 etc. Usually, there can be different manners for storing the read image, such as 32 bit full-color image. In addition, there can be different formats for storing an image, such as BMP, JPEG or TIFF formats etc. Prior to processing the input original image, all the input original images are converted into gray-level images having 256 gray-levels of 0–255.

Referring to FIG. 3, first, at step S301; image reading unit 201 reads the gray-level of each pixel of an original image 800A, for which binarization process is to be made. If the original image 800A is encoded, such as using JPEG, then image reading unit 201 will decode it prior to reading its image data. Of course, the gray-level of each column of pixels can be read simultaneously, sequentially, or respectively.

Figure 8B:
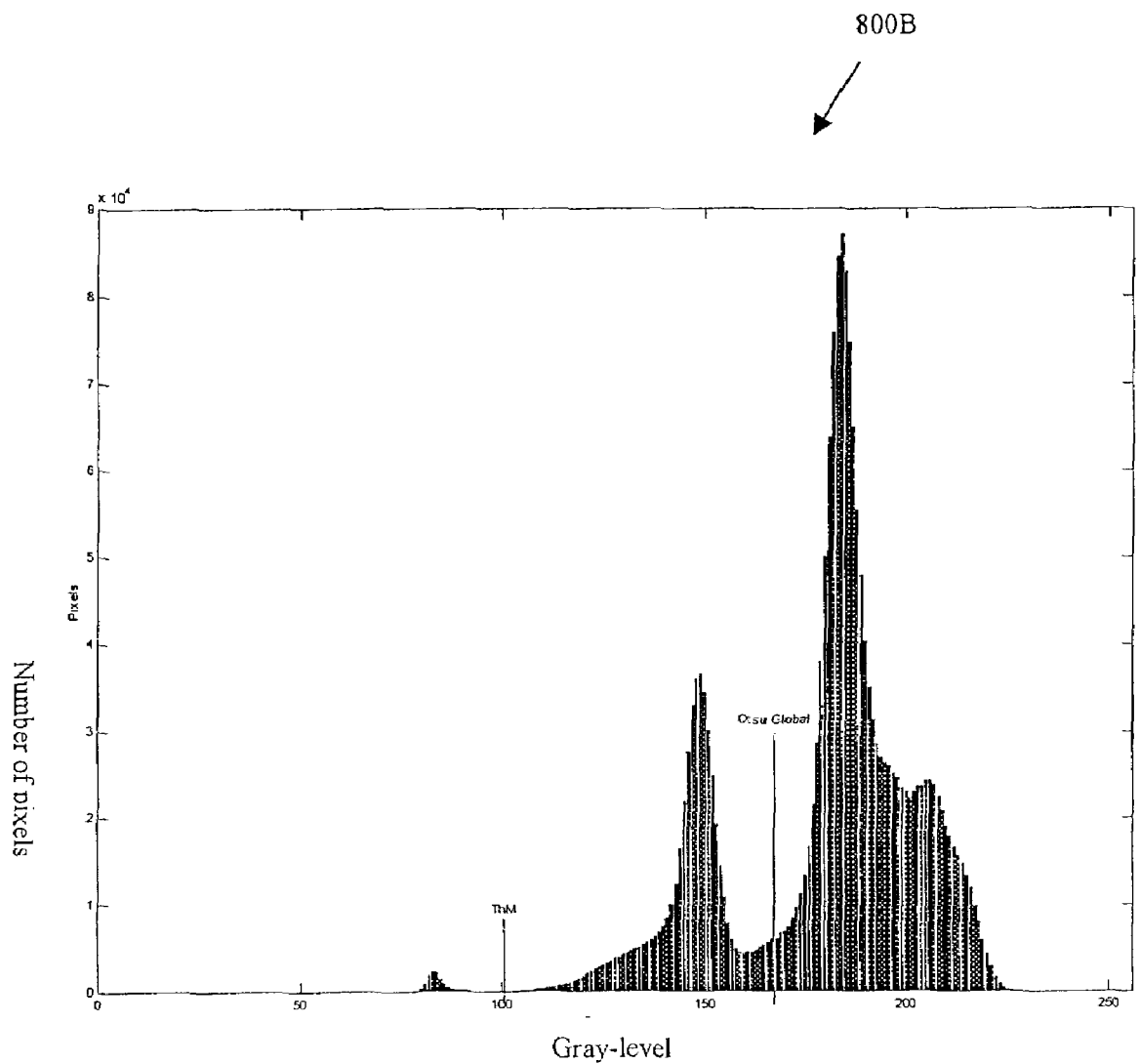
FIG. 8B shows an gray-level histogram of the original image shown in FIG. 8A.

After step S301, the flow goes to step S302, where image gray-level statistical unit 202 performs a statistical process on the gray-level of all the pixels of the original image 800A read by the image reading unit 201 and determines the number of pixels, that correspond to each gray-level, in the original image 800A. based on the determined number of pixels of each gray-level, an image pixels gray-level histogram 800B of original image 800A is produced, as shown in FIG. 8B. In FIG. 8B, the X coordinate denotes the gray-level of pixels, and the Y coordinate denotes the number of pixels.

Figure 4:
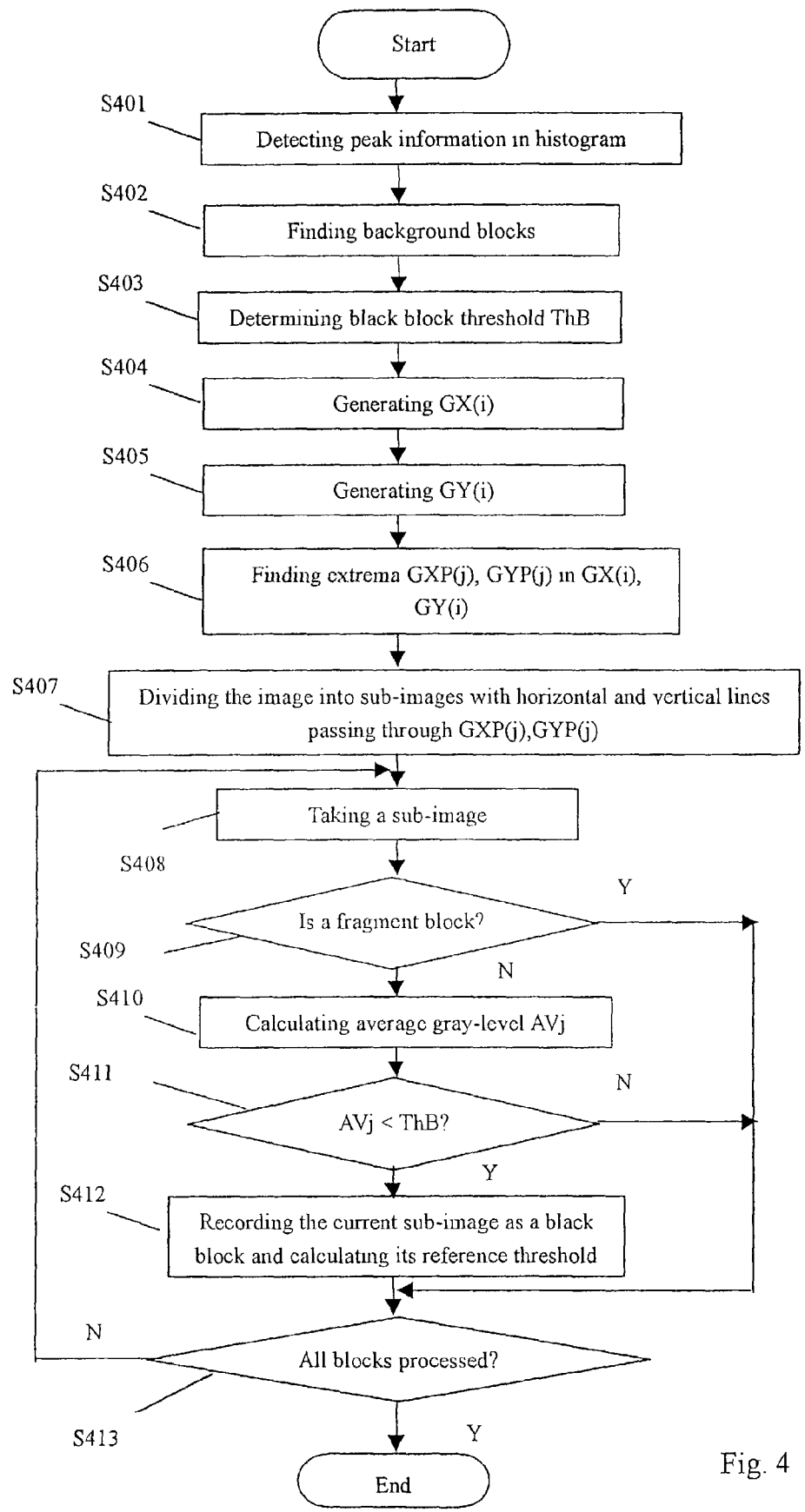
FIG. 4 is a flowchart showing the process for finding black blocks in an image.

After step S302, the flow goes to step S303, where black block finding unit 203 determines whether black blocks exist in original image 800A (a black block is a sub-image having a parameter that is determined in accordance with gray-level statistical characteristics and is smaller than a predetermined parameter threshold) and determines the number, positions and reference thresholds of existing black blocks. FIG. 4 is a flowchart showing a specific example of a process for finding black blocks.

An example of a process for finding black blocks in original image 800A, as that shown in FIG. 8A, will be described below with reference to the flowchart of FIG. 4.

Referring to FIG. 4, at step S401, based on the image pixel gray-level histogram of original image 800A as determined in step S302, peak characteristic information such as the positions of all the peaks, their left valleys and right valleys etc. are detected in the gray-level histogram. The histogram can be smoothed first, and then extremum points are found out in the histogram using differential method so as to find out the positions of peak an its left and right valleys in the histogram. As an exemplary but not limiting manner, in an embodiment, every 16 dots are combined in the original histogram, thereby obtaining a new histogram with a range of 0–16, and then peak positions and valley positions are found in the new histogram using differential method.

In the present example, it can be determined that the total number of peaks in the histogram of FIG. 8B is 3, and the 3 peaks have the following information:

TABLE 1

| Serial No. of peak | position of peak (gray-level) | count of peak | position of left valley (gray-level) | position of right valley (gray-level) | area of peak |
|---|---|---|---|---|---|
| 1 | 82 | 2522 | 63 | 101 | 15059 |
| 2 | 148 | 36681 | 101 | 160 | 473720 |
| 3 | 183 | 86959 | 160 | 255 | 1566255 |

Wherein the area of a peak is defined as the total number of pixels from the left valley of the peak to the right valley of the peak.

After step S401, the flow goes to step S402, where it is determined whether background blocks exist in original image 800A; a background block is a block having gray-levels slightly lower than its surrounding areas, and there may be over the background block other blocks having still lower gray-levels, such as blocks of characters. To simplify the description, we assume that the table image has background blocks having a single gray-level. Under such an assumption, determination is made mainly to the circumstance of the peaks in the gray-level histogram of the table image to determine whether there exists a relatively big peak on the left of the rightmost peak (we regard it as the base peak) and whether the area on the left of the peak is relatively large; and if both "YES", then the second peak from the right is determined as a background peak. In the present embodiment, three conditions are taken as criterions for a table image:

(1) the peak area (number of pixels) of the base peak is larger than the total number of pixels of the original image multiplied by SP1;
(2) the peak area (number of pixels) of the second peak from the right is larger than the peak area (number of pixels) of the base peak multiplied by SP2; and
(3) the total area (number of pixels) on the left of the left valley of the second peak from the right is larger than the total number of pixels of the original image multiplied by SP3, where parameters SP1, SP2, and SP3 are predetermined values. A range of parameter SP1 is from 0.05 to 0.2 and a preferred value is 0.1; a range of parameter SP2 is from 0.001 to 0.08 and a preferred value is 0.035; and, a range of parameter SP3 is from 0.002 to 0.02 and a preferred value is 0.005.

As to image 800A, the peak area of the base peak is 1566255, the total number of pixels of the image is 2050290, the peak area of the second peak from the right is 473720, and the total area on the left of the left valley of the second peak from the right is 15059, and these values satisfy the above three conditions, so it is determined that the original image 800A contains a background block, and the peak position of the background peak formed by the background block is at 148.

After step S402, the flow goes to step S403, where a black block threshold ThB is determined for determining a block having an average gray-level smaller than it as a black block. In table images, the areas of black blocks are usually relatively small. Thus, in the gray-level histogram of original image, the areas (numbers of pixels) of the peaks from left to right are sequentially added, and when the added area exceeds the total area (number of pixels) of the original image multiplied by a pre-selected factor parameter SP4, the right valley of the immediately previous peak is chosen as the black block threshold ThB. In the present embodiment, the parameter SP4 has a range of from 0.1 to 0.35, and a preferred value of SP4 is 0.2. Thus, it can be seen that for original image 800A, the black block threshold ThB is chosen at the right valley of the first peak, and ThB=101.

After step S403, the flow goes to step S404, where the gray-levels of all the pixels in each column of the original image are added to obtain a sequence GX(i), where the ith item is the sum of all the pixels in the ith column of the original image. Then the flow goes to step S405.

At step S405, the gray-levels of pixels in each row of the original image are added to obtain a second sequence GY(i), wherein the ith item is the sum of the gray-levels of all the pixels in the ith row of the original image.

The flow then goes to step S406, where an operator, such as operator (0.1, 1, 5, 0, −5, −1, −0.1), is applied on the sequence GX(i) obtained in step S403 and on the sequence GY(i) obtained in step S404 so as to find the positions of all the variation extrema GXP(j) and GYP(j) in sequences GX(i) and GY(i), respectively.

That is, by applying an operator such as (0.1, 1, 5, 0, −5, −1, −0.1) on the sequence GX(i), a new sequence gXP(j) is generated. Then, all the items in gXP(j) that each has an absolute value greater than a predetermined value is found out, and the values of j of these items, if any, are the horizontal positions of the variation extrema in the sequence GX(i).

Similarly, by applying an operator such as (0.1, 1, 5, 0, −5, −1, −0.1) on the sequence GY(i), a new sequence gYP(j) is generated. Then, all the items in gYP(j) that each has an absolute value greater than a predetermined value is found out, and the values of j of these items, if any, are the vertical positions of the variation extrema in the sequence GY(i).

Obviously, the operator used is not limited to operator (0.1, 1, 5, 0, −5, −1, −0.1), and it is also not limited to a seven-point operator. Moreover, other mathematical approach may be utilized to find out the positions of variation extrema in sequences GX(i) and GY(i).

Then, the flow goes to step S407, where the original image is divided into a plurality of sub-image blocks of different sizes using horizontal and vertical lines each passing through one of the gray-level variation extrema GXP(j) and GYP(j).

Then the flow goes to step S408, where the sub-image blocks are sequentially selected according to the order of from left to right and from top to bottom, and the selected sub-image blocks are for used in later processing, as will be explained.

Then, the flow goes to step S409, where it is determined whether a current sub-image block is a fragment block. The criterion of the determination is the size information of the block. In the present embodiment, when it is determined that the width WW of a sub-image block or the height WH of a sub-image block is smaller than a preset value SP5, then the sub-image block is determined to be a fragment block and the flow goes to step S413, otherwise the flow goes to step S410. A preferred value of SP5 is 16, and a range of SP5 is from 10 to 20.

At step S410, the average gray-level AVj of the current sub-image block is calculated, then the flow goes to step S411.

At step S411, it is determined whether the current sub-image is a black block. The criterion of the determination is whether the average gray-level AVj of the current sub-image block is smaller than the black block threshold ThB calculated in step S403. if AVj is smaller than ThB, then the current sub-image block is determined to be a black block and the flow goes to step S412, otherwise the flow goes to step S413.

At step S412, the current sub-image block is recorded as a black block, and the coordinates of its upper left corner and its lower right corner are recorded. In addition, a reference threshold of the current sub-image block, i.e., a threshold corresponding to the gray-level distribution of the black block (sub-image) itself, is calculated, and the calculation can be performed using any prior art binarization method, such as Otsu method, NiBlack method, minimum error method, or maximum entropy method, etc. In the present embodiment, Otsu method is used.

Then the flow goes to step S413, where it is determined whether all the sub-image blocks have been processed. If all the sub-image blocks have been processed, the black block finding process ends, otherwise the flow returns to step S408.

In the example of image 800A, 4 black blocks are found.
Back to FIG. 3, after step S303, the flow goes to step S304, where the minimum threshold determining unit 204 calculates a global minimum threshold of the original image. The process for calculating the minimum threshold is shown by FIG. 5.

Figure 5:
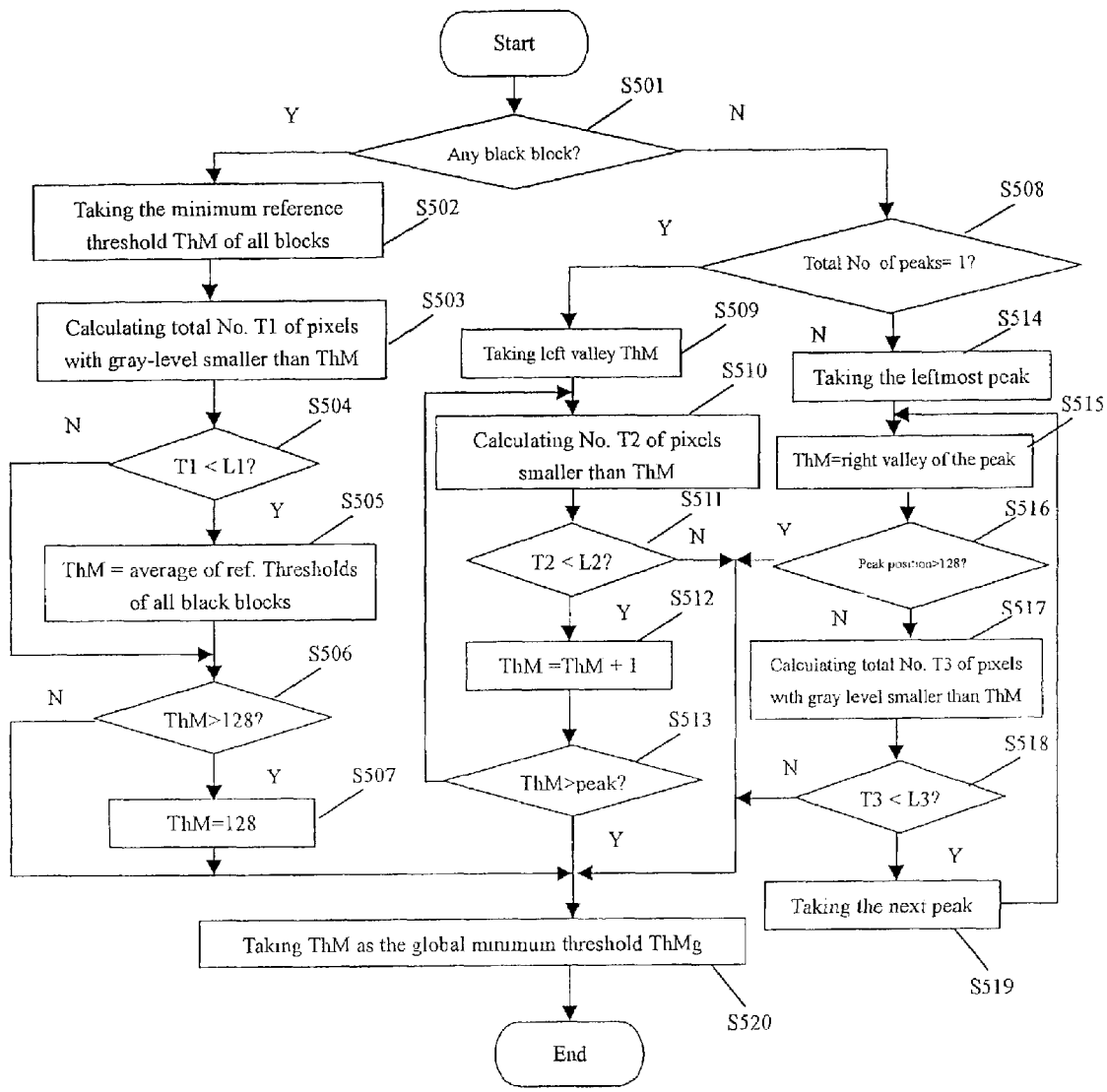
FIG. 5 is a flowchart showing the process for determining a minimum threshold of an image.

FIG. 5 is a flowchart showing the process for calculating a minimum threshold of an original image.

Referring to FIG. 5, at step S501, it is determined whether black blocks exist, mainly by checking whether black blocks are found out in step S303. If "YES", the flow goes to step S502, otherwise the flow goes to step S508. In the example of original image 800A, since black blocks are found out in step S303, the flow goes to step S502.

At step S502, based on the reference threshold of each of the black blocks calculated in step S303, the minimum ThM among the reference thresholds is determined. In the example of original image 800A, it is determined ThM=101.

After step S502, the flow goes to step S503, where the total number T1 of pixels each having a gray-level smaller than ThM in the original image is calculated. In the example of original image 800A, it is calculated T1=15059.

After step S503, the flow goes to step S504, where it is determined whether ThM is too small (if ThM is too small, then too much content will be lost in the binarization process), with the criterion $$T1 < L1? \tag{1}$$

Where L1 is the total number of pixels of the original image multiplied by SP6. SP6 is a predetermined value with a range of 0.002 to 0.01 and a preferred value of 0.005. If the above condition (1) is satisfied, the flow goes to step S505, otherwise the flow goes to step S506.

In the example of original image 800A, L1=0.005× 2050290=10251, so T1>L1 and the above condition (1) is not satisfied, so the flow goes to step S506.

At step S505, as it is determined in step S504 that ThM is too small, so ThM is re-calculated by allowing ThM to be equal to the average of the reference thresholds of all the black blocks.

At step S506, the global minimum threshold is controlled so that it is not too great. In an embodiment, according to analysis over a large number of table images, a fixed value of 128 is chosen as the upper limit of the global minimum threshold. Of course, values other than 128 can be selected, and any value in the range of 100–150 can be selected as the upper limit of the global minimum threshold. Then the flow goes to step S520.

After step S501, if no black block exists, the flow goes to step S508, where it is determined whether the image gray-level histogram of the original image contains a single peak. If "YES", the flow goes to step S509, otherwise the flow goes to step S514.

At steps S509 to S513, as the gray-level histogram of original image contains a single peak, so a position, at which the total number of pixels T2 in the original image having a gray-level smaller than ThM is smaller than a parameter L2, is looked for, wherein L2 equals to the total area of the peak multiplied by SP7, and SP7 is a preset value with a range of 0.02 to 0.1 and a preferred value of 0.05.

At steps S514 to S519, as the gray-level histogram of original image contains a plurality of peaks, beginning from the leftmost peak in the gray-level histogram until a peak located at a gray-level smaller than 128, the right valley of a peak, by which the accumulated number T3 of pixels each having a gray-level smaller than ThM in the original image is smaller than a parameter L3, is sequentially searched for, wherein L3 is the total number of pixels in the original image multiplied by SP8 and SP8 is a preset value in a range of 0.002 to 0.01 and a more preferred value of 0.005.

Finally, at step S520, ThM is determined as the global minimum threshold ThMg that is sought for. In the example of original image 800A, ThM is 101, so the global minimum threshold is 101.

Back to FIG. 3, after step S304, the flow goes to step S305, where the edge criterion determining unit 205, based on the gray-level histogram of the pixels of the original image as obtained in step S302, determines a criterion for extracting foreground edges in the image.

The determination of edge criterion will be described below. For some details of description, reference may be made to the Chinese Application No. 01124725.8 entitled "image processing method, system and storage medium", filed by the same applicant of the present application and is invented by the same inventors of the present application.

Image Edge Criterion Determining Unit

Figure 9:
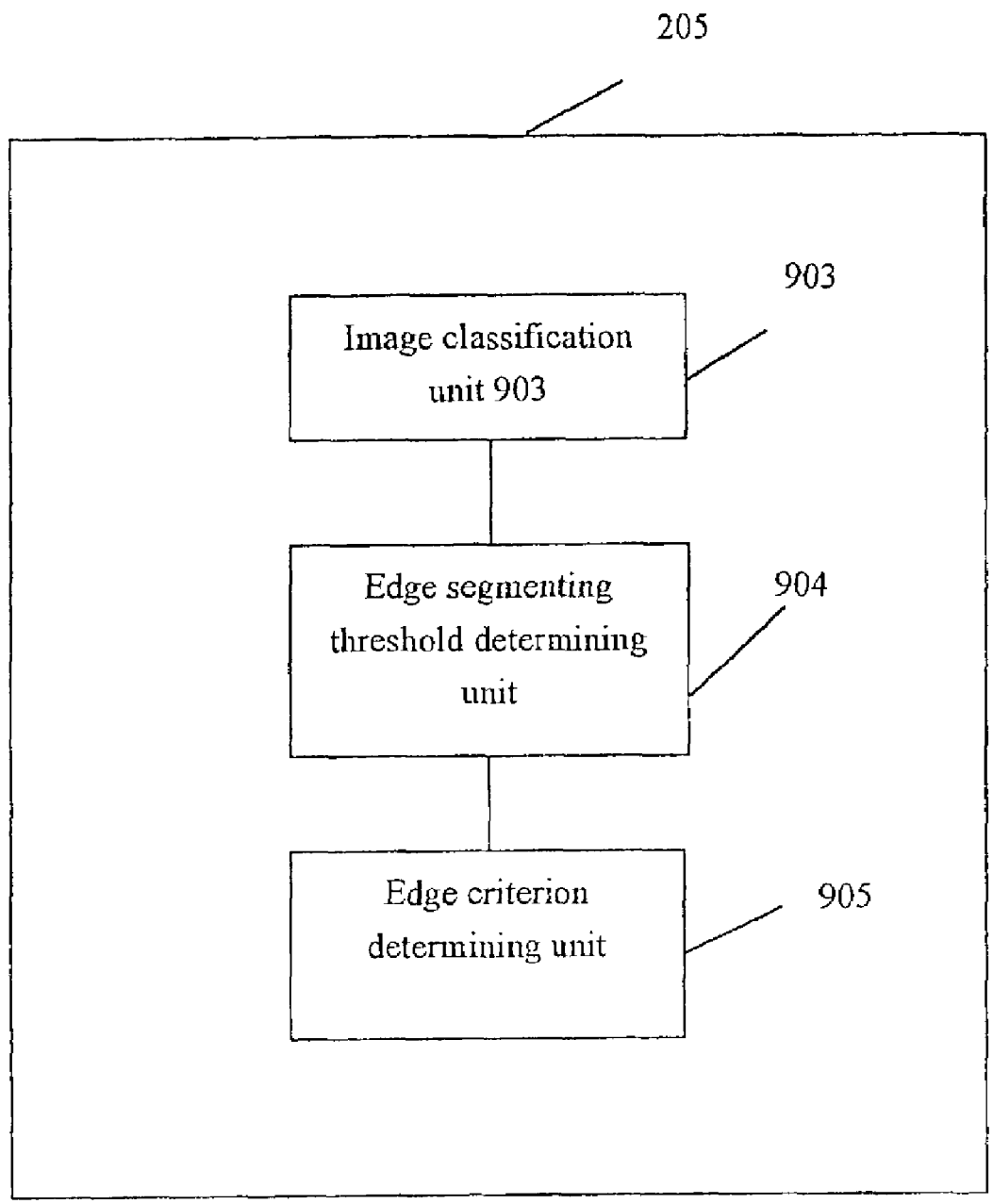
FIG. 9 is a structural block diagram of an image edge detecting apparatus according to an embodiment of the present invention.

FIG. 9 shows a structural block diagram of an image edge criterion determining unit according to an embodiment of the present invention.

The edge criterion determining unit of the present embodiment comprises an image classification unit 903, segmenting threshold determining unit 904, and an image edge criterion determining unit 905.

Based on the gray-level histogram obtained by the image gray-level statistical unit 202, the image classification unit 903 determines an initial segmenting threshold for dividing a foreground and a background in the gray-level histogram.

In the present invention, according to the characteristics of the gray-level histogram of an image, the image may be classified into one of three types: type 0, type I and type II. An image of type 0 is a normal image, which can be properly segmented into a foreground and a background using the initial segmenting threshold. Here, the foreground of an image comprises various information to be shown with the image, such as characters, charts, lines, etc. while the background of an image includes information for decorating or foiling the foreground of the image, such as the base color(s) of the image, etc. The image 800A shown in FIG. 8A is an example of an image of type 0.

An image of type I is an image which, when being segmented into a foreground and a background using the initial segmenting threshold, has an inaccurate foreground, i.e. a part of its foreground is segmented into its background. An image of type II is an image which, when being segmented into a foreground and a background using the initial segmenting threshold, has an inaccurate background, i.e. a part of its background is segmented into its foreground.

Referring to FIG. 9, an image classification unit 903 classifies an original image into one of three types, type 0, type I and type II.

Then, for an image determined as being a type 0 image, edge segmenting threshold determining unit 904 supplies an initial segmenting threshold for dividing the gray-level histogram of the image into a foreground and a background to the edge criterion determining unit 905, and the edge criterion determining unit 905 determines a gray-level statistical average of the foreground and the background of the image, as will be described later.

For an image which is classified as being an image of type I or type II, the initial segmenting threshold for dividing the background and foreground of the gray-level histogram of the image is adjusted by the segmentation threshold determining unit 904, so as to determine an appropriate segmenting threshold for dividing the foreground and background of the image, as will be described later. Then, the edge criterion determining unit 905 calculates a gray-level statistical average of the background and the foreground of the image based on the determined segmenting threshold of the foreground and background of the image. Based on the calculated gray-level statistical average of the foreground and background, the edge criterion determining unit 905 determines an image edge criterion, as will be explained later.

Image Edge Detecting Process

Figure 10:
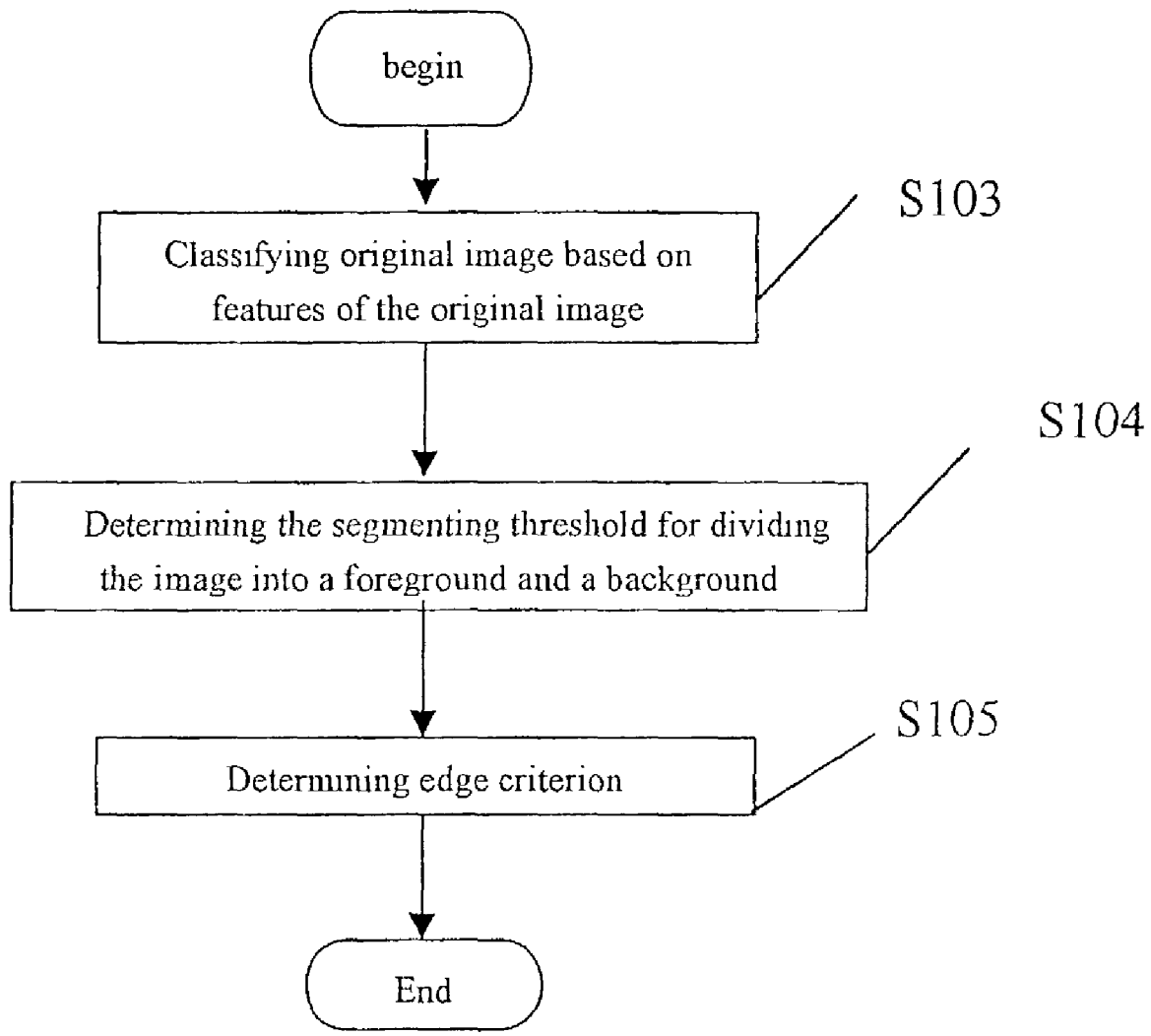
FIG. 10 is a flow chart showing an image edge detecting process of the embodiment shown in FIG. 9.

FIG. 10 is a flowchart showing the process of image edge detection according to an embodiment of the present invention. A process for detecting edges in an image will be described in detail below with reference to FIGS. 10.

Referring FIG. 10, first, in step S103, the image classifying unit 903, based on the image pixel gray-level histogram of the original image determined in step S302, determines image features such as the width of the gray-level histogram 800B, the initial segmenting threshold for dividing the foreground and the background of the image, and the gray-level statistical average; and based on these features, the image classifying unit 903 classifies the original image into one of the above-mentioned type 0 image, type I image, or type II image. The process for classifying the image will be described in more detail below with reference to FIG. 11.

Figure 11:
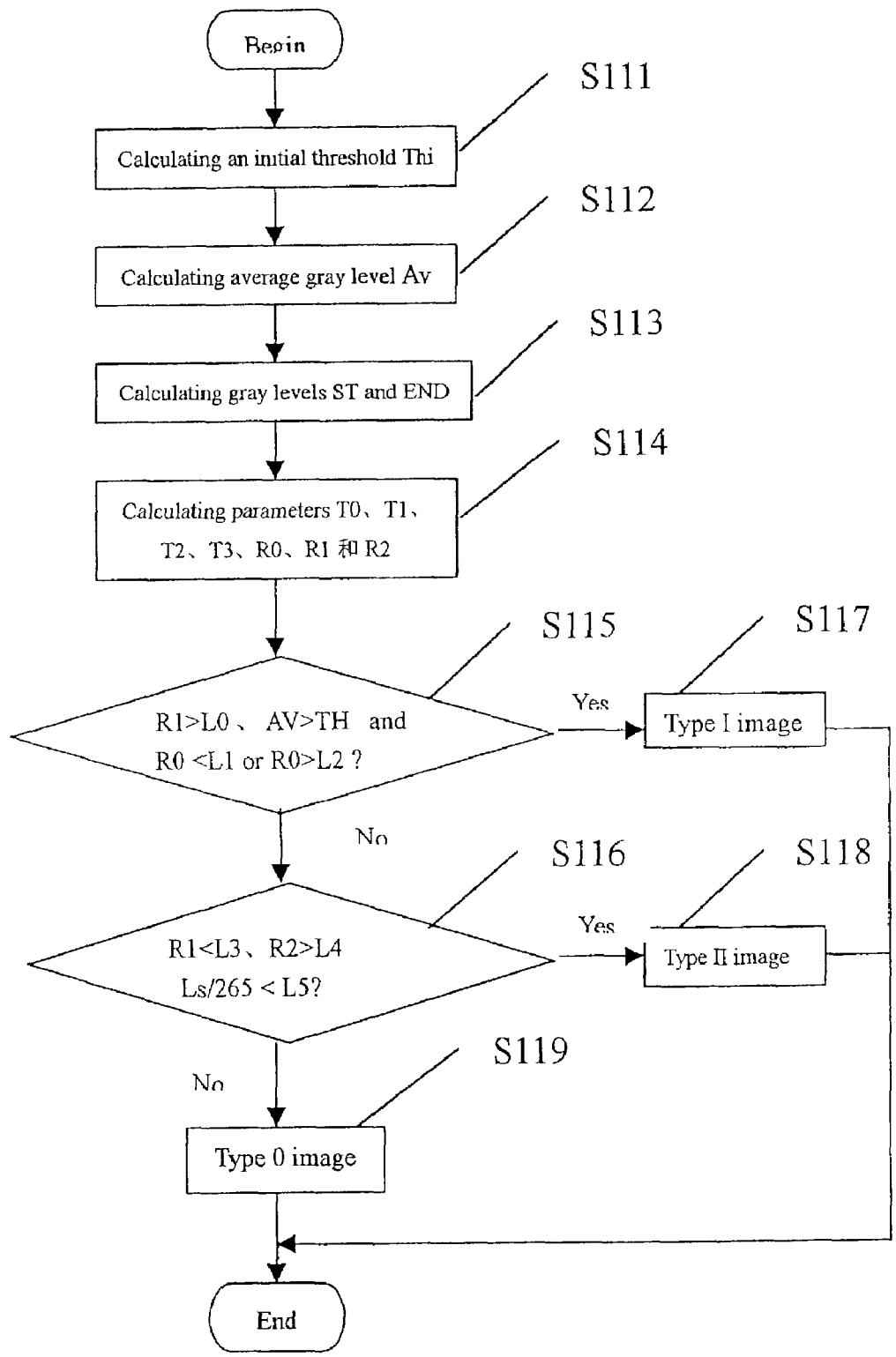
FIG. 11 is a flow chart of a process for classifying an image.

FIG. 11 is a flowchart for showing the process of classifying an image.

The process for classifying the original image is described in detail with reference to FIG. 11.

As shown in FIG. 11, in step S111, an initial segmenting threshold Thi for segmenting a foreground and a background in the original image is calculated according to the gray-level histogram of the original image determined in step S302. The initial segmenting threshold Thi may be calculated using any known method, such as Otsu method, NiBlack method, least error method or maximum entropy method, etc. Otsu method is used in the present embodiment. As to Otsu method, reference can be made to "A Threshold Selection Method from Gray-level Histograms", IEEE Trans. On System, Man, and Cybernetics, Vol. SMC-9, No. 1, pp. 62–66, January 1979.

After step S111, the flow goes to step S112, where the statistical average Av of the gray-levels of all pixels in the histogram of the original image is calculated.

Then, the flow goes to step S113, where the gray-level ST of a starting point and the gray-level END of an ending point in the gray-level histogram are determined, so as to eliminate the gray-levels in the front and rear parts of the gray-level histogram, which have no significant influence over the overall calculation of parameters but have undesired influence to the calculation of edge criterion.

The starting point ST and the ending point END can be determined as:

$$K = T^{1/2}/a \quad (2)$$

Where K is the pixel number corresponding to the gray-level of the starting point ST or that of the ending point END of the histogram, T is the total number of pixels of the original image, and a is a predetermined value, such as 50. The value of a can be selected in the range of 20–150.

After step S113, the flow enters step S114, where a first decision ratio R0, a second decision ratio R1 and a third decision ratio R2 are calculated based on the pixel numbers of the original image and its corresponding gray-level histogram.

The first decision ratio R0 is given by formula (3):

$$R0 = T11/T0 \quad (3)$$

Where R0 denotes the first decision ratio; T0 denotes the total pixel number of the original image, i.e. the total number of pixels within the range of gray-level from 0 to 255; and, T11 denotes the number of pixels included in the range of gray-level from 0 to the gray-level statistical average Av.

In addition, the second decision ratio R1 is given by formula (4):

$$R1 = T13/T12 \quad (4)$$

Where R1 denotes the second decision ratio; T12 denotes the number of pixels included in the range of gray-level from 0 to the initial segmenting threshold Thi of the histogram; and, T13 denotes the number of pixels included in the range from the initial segmenting threshold Thi to the gray-level statistical average Av of the histogram.

Moreover, the third decision ratio R2 is given by formula (5):

$$R2 = T12/T0 \quad (5)$$

Where R2 denotes the third decision ratio; T12 denotes the number of pixels included in the range of gray-level from 0 to the initial segmenting threshold Thi of the histogram; T0 denotes the total pixel number of the original image, i.e. the total number of pixels within the range of gray-level from 0 to 255.

From the above, it can be seen that in the calculation of the first, second, and third decision ratio R0, R1, and R2, the number of pixels are all counted starting from the gray-level of zero (0). Similarly, the number of pixels can also be counted starting from the gray-level ST of the starting point determined in step S113. Likewise, all the pixel counts that end at 255 can be replaced with counts that end at the gray-level END of the ending point.

After step S114, the flow goes to step S115, where it is determined whether the following relations (6) are satisfied:

$$R1 > L0$$

$$Av > Thi$$

$$R0 < L11 \text{ or } R0 > L12 \quad (6)$$

Where R0 is the first decision ratio, R1 is the second decision ratio, Av denotes gray-level statistical average of all the pixels, Thi is the initial segmenting threshold, L0 is a first preset value, L11 is a second preset value, and L12 is a third preset value.

In step S115, if the above relations (6) are satisfied, then it is determined that the image is a type I image in step S117. If it is determined that the relations (6) are not satisfied, then the flow goes to step S116.

In the present embodiment, a preferred range of the first preset value L0 is 2–5 and a preferred value of L0 of 3.5 is taken; a preferred range of L11 is 0.35–0.5, and a preferred value of L11 of 0.45 is taken; a preferred range of L12 is 0.5–0.65, and a preferred value of L12 of 0.55 is taken.

Back to step S115 in FIG. 11, after step S115, since it is determined in the present exemplary example that the original image is not a type I image, the flow goes to step S116, where it is determined whether the following relations are satisfied:

$$R1 < L13$$

$$R2 > L4$$

$$Ls/256 < L5 \quad (7)$$

Where R1 is the second decision ratio, R2 is the third decision ratio, Ls is the distance between the gray-level END of the ending point and the gray-level ST of the starting point in the histogram. L13, L4 and L5 are the fourth, fifth, and sixth preset values, respectively.

If it is determined in step S116 that the above relations (7) are satisfied, then the image, from which edges are to be extracted, is determined as a type II image in step S118. If it is determined in step S116 that the above relations (7) are not satisfied, then the flow goes to step S119.

In step S119, it is determined that the original image is a type 0 image. That is, the image can be clearly divided into a foreground portion and a background portion using the initial segmenting threshold.

Back to step S103 of FIG. 10, after determining the type of the original image, the flow goes to step S104. At step S104, the segmenting threshold for dividing the original image into a foreground and a background is calculated. As to a type I image or a type II image, since it is not properly divided into a foreground and a background, so the initial segmenting threshold needs to be adjusted.

In the situation where the original image is a type 0 image, it can be properly divided into a foreground and a background using its initial segmenting threshold Thi, so there is no need to adjust the initial segmenting threshold of original image.

Figure 12:
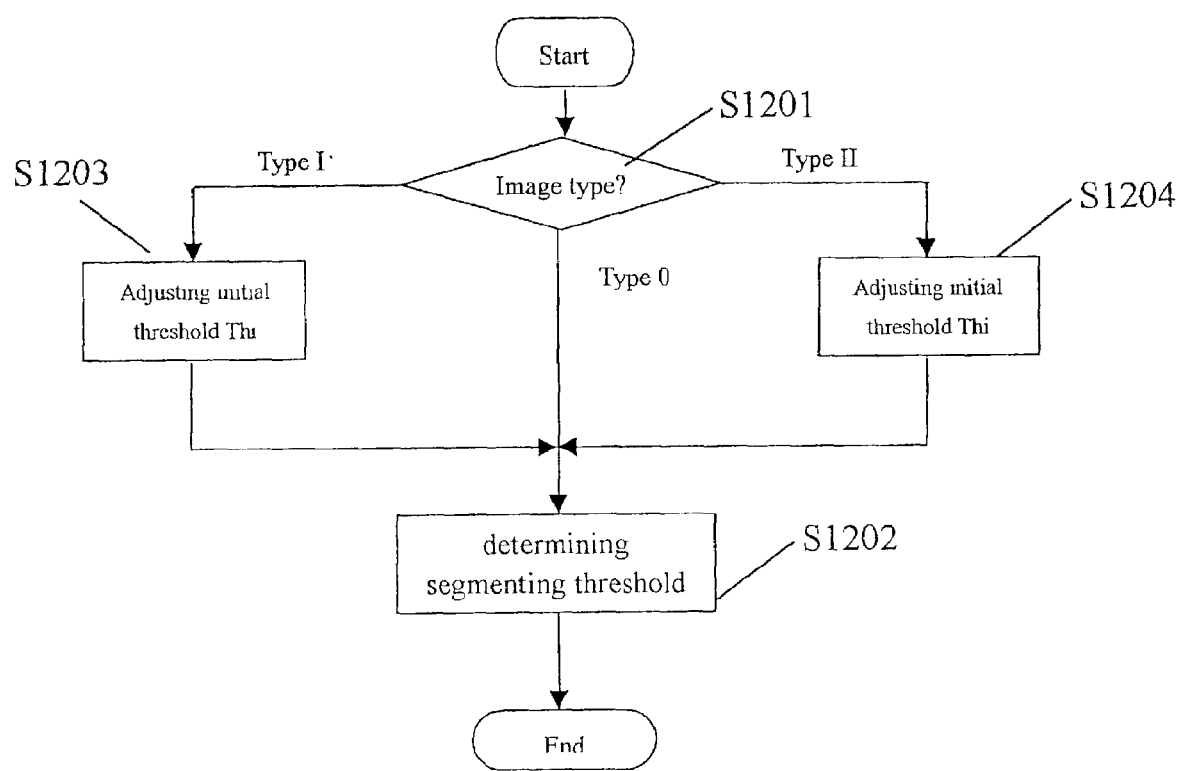
FIG. 12 is a flow chart of a process for determining a segmenting threshold for dividing an original image into a background and a foreground.

FIG. 12 is a flowchart showing the process for determining the segmenting threshold for dividing the original image into a foreground and a background. Referring FIG. 12, since the original image is a type 0 image, so the initial segmenting threshold Thi calculated in step S1111 is used as the segmenting threshold Thf for dividing the image into a foreground and a background.

Then, the edge criterion of the image is determined. The edge criterion of the original image can be taken as the difference of gray-level statistical average (Av2−Av1) of pixels on each side of the segmenting threshold for dividing the image into a foreground and a background.

It is to be noted that according to the present embodiment, the difference (Av1−Av2) of the gray-level statistical averages on each side of the segmenting threshold is directly taken as image edge criterion, but the present invention is not limited to this. Without departing from the spirit and scope of the present invention, the image edge criterion can be increased or decreased. For example, an image edge criterion can be taken as (Av1−Av2) multiplied by a coefficient.

Image Edge Extraction of a Type I Image

Description will be given below to an image edge extracting process for an original image determined as a type I image according to the present invention.

As to a type I image, since the foreground as determined using the initial segmenting threshold Thi is less than it should be, so an adjustment needs to be made to its initial segmenting threshold, as shown with step S1203 of FIG. 12. Details of the adjustment process are described with reference to FIG. 13.

Figure 13:
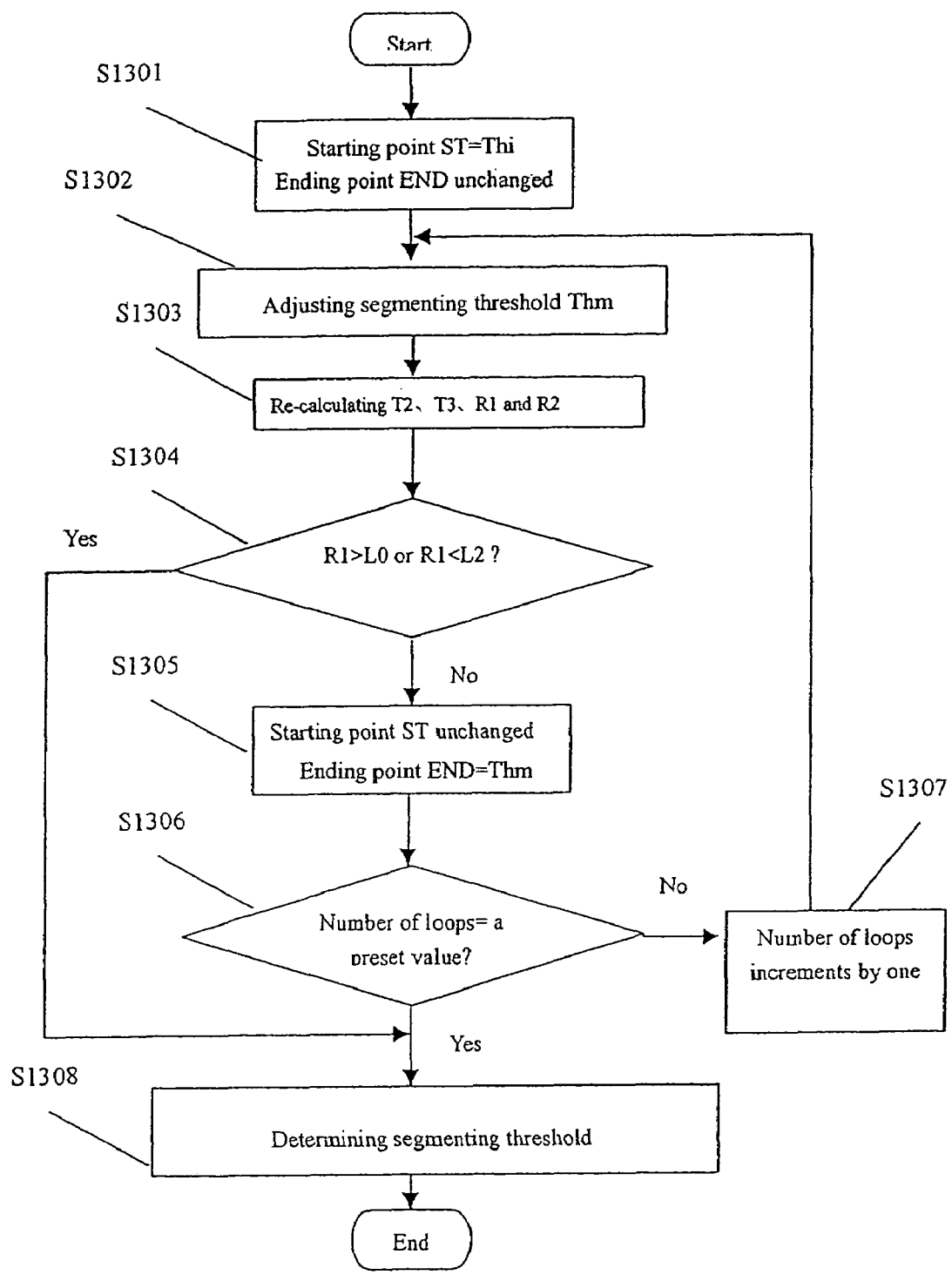
FIG. 13 is a flow chart of a process for adjusting the image segmenting threshold of a type I image.

FIG. 13 is a flowchart of a process for adjusting the initial segmenting threshold for dividing the original image of type I into a foreground and a background.

Referring to FIG. 13, after the start of the process, at step S1301, a new range of the segmenting threshold is defined, which has a starting point gray-level at the initial segmenting threshold Thi as obtained in step S111 and an unchanged ending point gray-level.

Then, the flow goes to step S1302, where a new segmenting threshold is determined. In the range from the new starting point gray-level to the ending point gray-level, using NiBlack method, a new segmenting threshold Thm is obtained. Details about NiBlack method can be seen in "Goal-Direction Evaluation of Binarization Methods", IEEE Transactions on Pattern Analysis and Machine Intelligence, Vol. 17, No. 12, Dec. 1995, pp 1191–1201. Of course, other methods, such as mean value method, least error method and maximum entropy method, etc., can be used.

After step S1302, the flow goes to step S1303, where the parameters T12, T13, R1 and R2 are re-calculated.

Then, the flow goes to step S1304, where it is determined whether the below relations are satisfied:

$$R1 > L0 \text{ or}$$

$$R1 < L13 \tag{8}$$

Where R1 is the second decision ratio, L0 denotes the first preset value, and L13 denotes the fourth preset value.

If it is determined that relations (8) are satisfied, meaning that the new segmenting threshold is appropriate, the flow goes to step S1308, where the new segmenting threshold Thm is taken as the segmenting threshold Thf for dividing the original image into a foreground and a background. If relations (8) are not satisfied, the flow goes to step S1305.

At step S1305, the range of segmenting threshold is re-determined. Referring to FIG. 13, at step S1305, the starting point gray-level ST is kept unchanged, while the gray-level END of ending point is replaced with the new segmenting threshold Thm.

Then, the flow goes to step S1306, where it is determined whether the number of cycles for determining the new segmenting threshold Thm exceeds a predetermined number, such as 4.

If the number of cycles does not exceed the predetermined number, the number of cycles is incremented by one, and the flow returns to step S1302.

If the number of cycles exceeds the predetermined number, the flow goes to step S1308.

Then, back to FIG. 10, after step S104, the flow goes to step S105, where the process determines the edge criterion based on the segmenting threshold Thf obtained in step S104. Details of the process are the same as that described for an image of type 0, that is, the average gray-levels Av1 and Av2 for pixels at the two sides of the segmenting threshold Thf, respectively, are calculated, and the edge criterion are determined based on the difference of the two average gray-levels (Av2−Av1).

Image Edge Determination of an Original Image of Type II

Description will be given below to the method for extracting edges in an original image determined as a type II image.

For an image of type II, since the background of the image as determined based on initial segmenting threshold Thi is less, so its initial segmenting threshold needs to be adjusted, as shown at step S1203 of FIG. 12. Details of adjustment process are shown with reference to FIG. 14.

Figure 14:
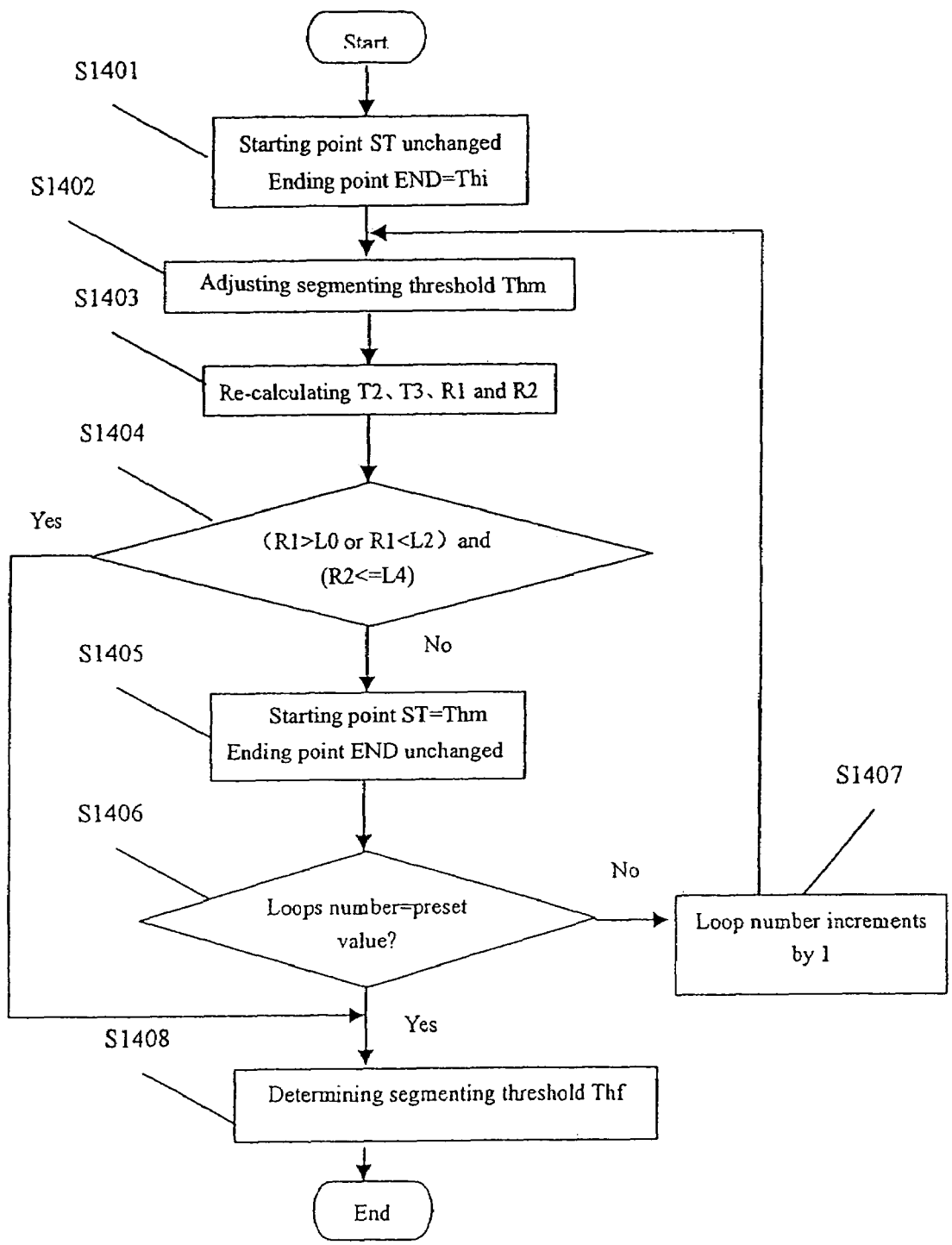
FIG. 14 is a flow chart of a process for adjusting the image segmenting threshold of a type II image.

FIG. 14 is a flowchart showing the process for adjusting the image segmenting threshold of a type II image.

Referring to FIG. 14, after the flow begins, at step S1401, where a new segmenting threshold is determined by taking the initial segmenting threshold Thi as obtained in step S111 as the new ending point gray-level while keeping the starting point gray-level unchanged.

Then, the process goes to step S1402, where a new segmenting threshold Thm is re-determined. For the range from the starting point gray-level to the new ending point gray-level, using NiBlack method, a new segmenting threshold Thm is obtained.

After step S1402, the flow goes to step S1403, where the parameters T12, T13, R1, and R2 are re-calculated.

Then, the flow goes to step S1404, where it is determined whether the following relations (9) are satisfied:

$$R1 > L0 \text{ or } R1 < L13$$

$$R2 < L4 \tag{9}$$

Where R0 is the first decision ratio, R1 is the second decision ratio, R2 is the third decision ratio, L0 is the first preset value, L11 is the fourth preset value, and L12 is the fifth preset value.

If it is determined that relations (9) are satisfied, meaning that the new segmenting threshold is an appropriate threshold, then the flow goes to step S1408, where the new segmenting threshold Thm is taken as the segmenting threshold Thf If it is determined that relations (9) are not satisfied, then the flow goes to step S1405.

At step S1405, a new range of the segmenting threshold is determined. Referring to FIG. 14, at step S1405, the ending point gray-level END is kept unchanged, while the new segmenting threshold Thm is taken as the gray-level ST of the starting point.

Then, the flow goes to step S1406, where it is determined whether number of times of determining the new segmenting threshold exceeds a preset number, such as 4.

If the number of times does not exceed the preset value, then it is incremented by one, and the flow returns to step S1402.

Then, back to FIG. 10, after step S104, the flow goes to step S105, where an edge criterion is determined based on the segmenting threshold Thf obtained in step S104. Details of obtaining the edge criterion is similar to those described with reference to an image of type 0, that is, the average gray-levels Av1 and Av2 for pixels at the two sides of the segmenting threshold Thf, respectively, are calculated, and the edge criterion are determined based on the difference of the two average gray-levels (Av2−Av1).

In the example shown in FIG. 800A, using the above-described method for determining edge criterion, it is determined in step S305 that the edge criterion of original image 800A is 55.

Figure 7:
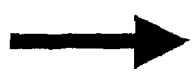
FIG. 7 is a diagram showing a template of a 3×3 Sobel gradient operator for calculating gray-level gradient and showing an improved exemplary template.
Figure 7:

After step S305, the flow goes to step S306, where the edge extracting unit 206 performs edge extraction using the edge criterion of original image obtained in step S305 and a Sobel edge operator (see C and D of FIG. 7). An improved Sobel edge extracting method is provided with a directional characteristic of the operator.

Referring to FIG. 7, a Sobel operator is used to determine whether a pixel (i,j) is an edge point, with a particular operation:

$$g(i,j)=\max\ (gi(i,j),gj(i,j))gi(i,j)=|f(i-1,j-1)+2f(i-1,j)+f(i-1,j+1)-f(i+1,j-1)-2f(i+1,j)-f(i+1,j+1)|gj(i,j)=|f(i-1,j-1)+2f(i,j-1)+f(i+1,j-1)-f(i-1,j+1)-2f(i,j+1)-f(i+1,j+1)| \qquad (10)$$

In equation (10), f(i,j) is a continuous function, g(i,j) is the maximum of gradient of image gray-level at (i,j), gi(,i,j) and gj(i,j) are gray-level components in horizontal direction and vertical direction, respectively.

Figure 8C:
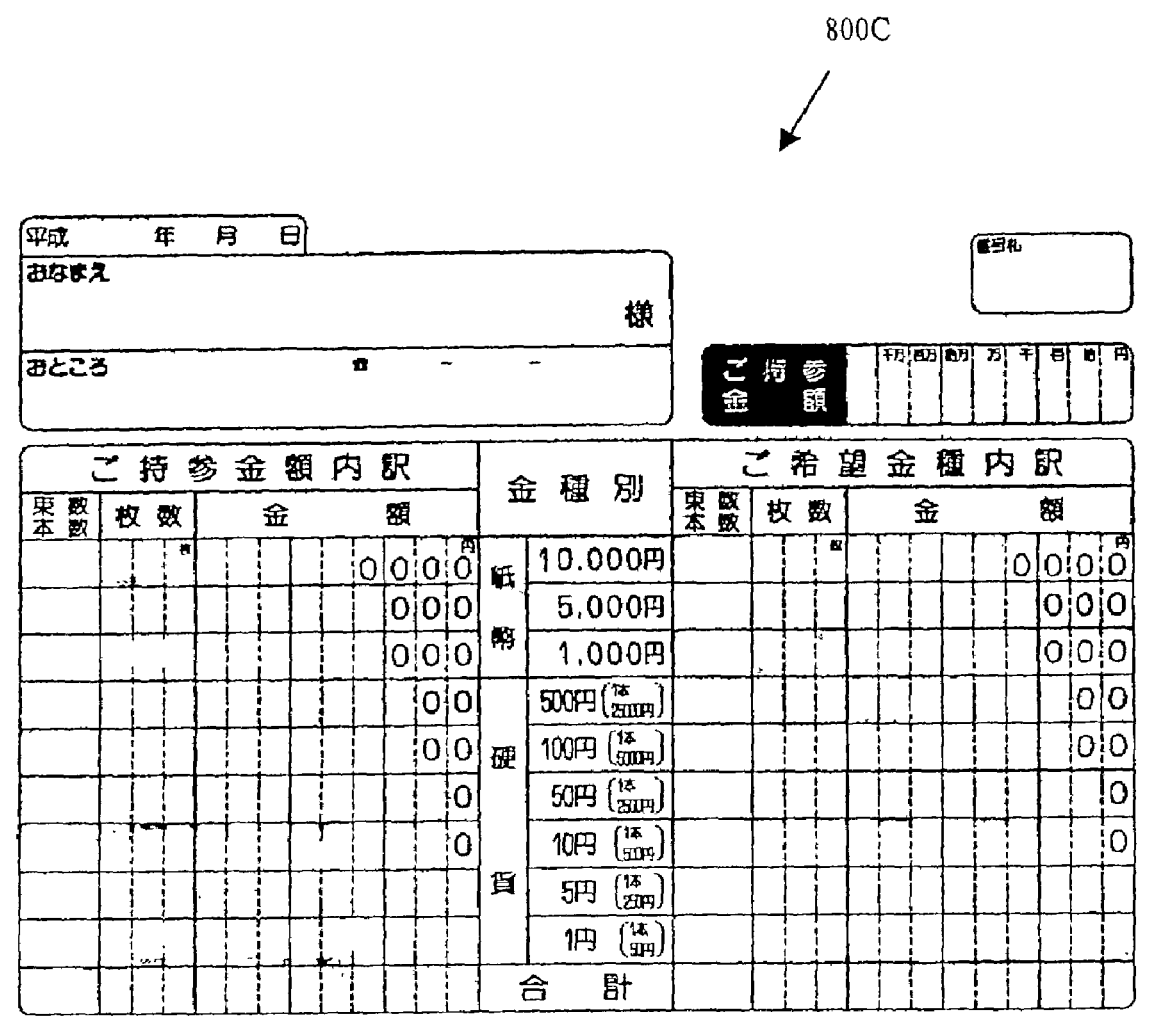
Figure 8D:
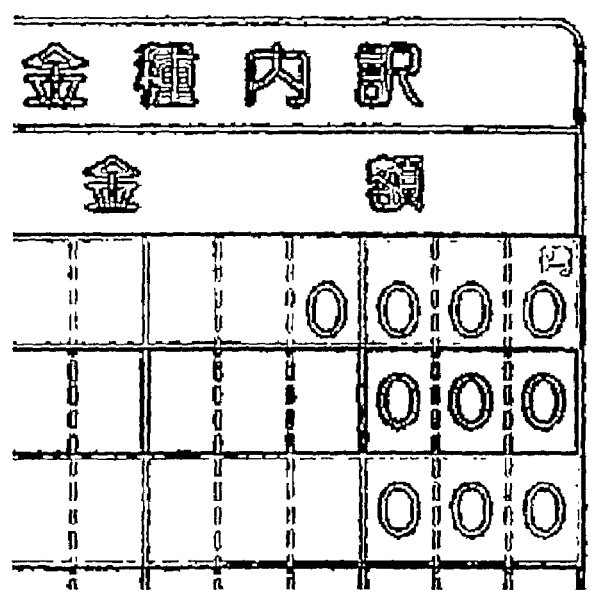
FIG. 8D shows an edge image obtained by processing the original image of FIG. 8A using Sobel method.

In a conventional Sobel edge extracting method, equation (10) is utilized to calculate the maximum of gradient of gray-level at each pixel in an original image, and the maximum is compared with the image edge criterion. A pixel having a maximum gradient of gray-level greater than the image edge criterion is determined as an edge pixel. An edge image 800D, as shown in FIG. 8D, is obtained from original image 800A using the conventional Sobel edge extracting method with an edge criterion of 55. from edge image 800D, it can be seen that the edges are relatively thick, with each line in the original image 800A becoming two parallel edge lines. FIG. 8D-A is an enlarged portion of edge image 800D, in which details of the edge image are shown more clearly.

So a directional attribute of Sobel operator is introduced to provide an improved Sobel edge extracting method.

The new method is $$gi(i,j)=f(i-1,j-1)+2f(i-1,j)+f(i-1,j+1)-f(i+1,j-1)-2f(i+1,j)-f(i+1,j+1)gj(i,j)=f(i-1,j-1)+2f(i,j-1)+f(i+1,j-1)-f(i-1,j+1)-2f(i,j+1)-f(i+1,j+1) \qquad (11)$$

As being different from equation (10), the calculation of gi(i,j) and gj(i,j) no longer take absolute values, and when determining which pixel is an edge pixel, the following manner are used:

In the horizontal direction, if gi(i,j) is positive and is larger than the edge criterion, meaning that the gray-level at the right side of pixel (i,j) is lower than the gray-level at the left side of pixel (i,j), then the pixel at (i+1,j) is regarded as an edge pixel; if gi(i,j) is negative and is smaller than the edge criterion, meaning that the gray-level at the left side of pixel (i,j) is lower than the gray-level at the right side of pixel (i,j), then the pixel at (i−1,j) is regarded as an edge pixel; if the above two conditions are not satisfied for all i values, then it is determined that no edge pixel in the horizontal direction exists. See part A of FIG. 7.

In the vertical direction, if gj(i,j) is positive and is large than the edge criterion, meaning that the gray-level at the upper side of pixel (i,j) is lower than that at the lower side of pixel (i,j), then the pixel (i,j−1) is regarded as an edge pixel; if gj(i,j) is negative and is smaller than the edge criterion, meaning that the gray-level at the lower side of pixel (i,j) is lower than that at the upper side of pixel (i,j), then pixel (i,j+1) is regarded as an edge pixel; if the above two conditions are not satisfied for all j values, then it is determined that no edge pixel in the vertical direction exists. See part B of FIG. 7.

Figure 8E:
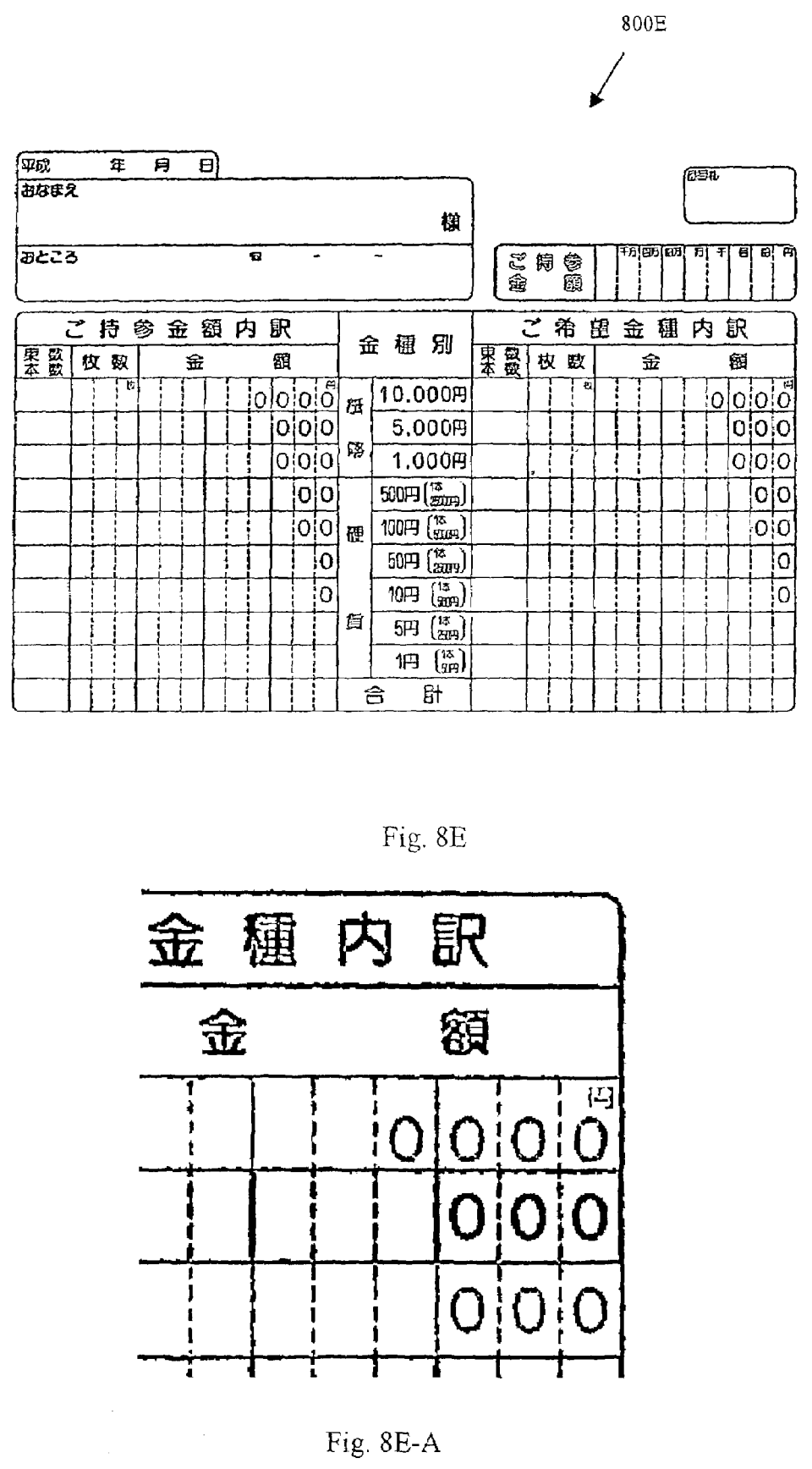

FIG. 8E shows an edge image 800E obtained from original image 800A using an edge criterion of 55 and the improved Sobel edge extracting method. From image 800E, it can be seen that all the edge lines are relatively thin, with each line in original image 800A still appearing as a single line in image 800E. FIG. 8E-A is an enlarged portion of edge image 800E, wherein details of the edge image are shown more clearly.

From image 800E, it can be seen that the improved Sobel edges are very close to the true edges in the foreground of the original image and can surely be directly filled into the resultant image of binarization process of a table image.

After step S306, the flow goes to step S307, where image dividing unit 207 divides the original image 800A into a plurality of sub-images each having N×N pixels. N is usually a multiple of 8 and is preferably in the range of 16 to 64 and more preferably has the value of 32. In the present example, N=32.

After the image is divided, some parameters are calculated for each of the sub-images, including the total number of edge pixels (edge pixels extracted in step S306), the average gray-level EdAV of all the edge pixels, the number of all the pixels each having a gray-level smaller than EdAV, the average gray-level GAV of all pixels, and the number of all pixels each having a gray-level smaller than GAV, etc.

It can be seen from this that the above-mentioned improved Sobel edge extracting method of the present invention has another advantage, that is, due to that the edges extracted by the improved method of the present invention is closer to the true edges of the foreground of an image than the edges extracted by a conventional Sobel method the average gray-level EdAV of the obtained edge pixels is allowed to more closely reflect the actual gray-level distribution of the current sub-image, resulting in that the results of binarization process of the present invention are more accurate.

After step S307, the flow goes to step S308, where the sub-image threshold determining unit 208 calculates a threshold of each of the sub-images, each of N×N pixels, divided in step S307. A process for determining the threshold of a sub-image is shown with reference to FIG. 6.

Figure 6:
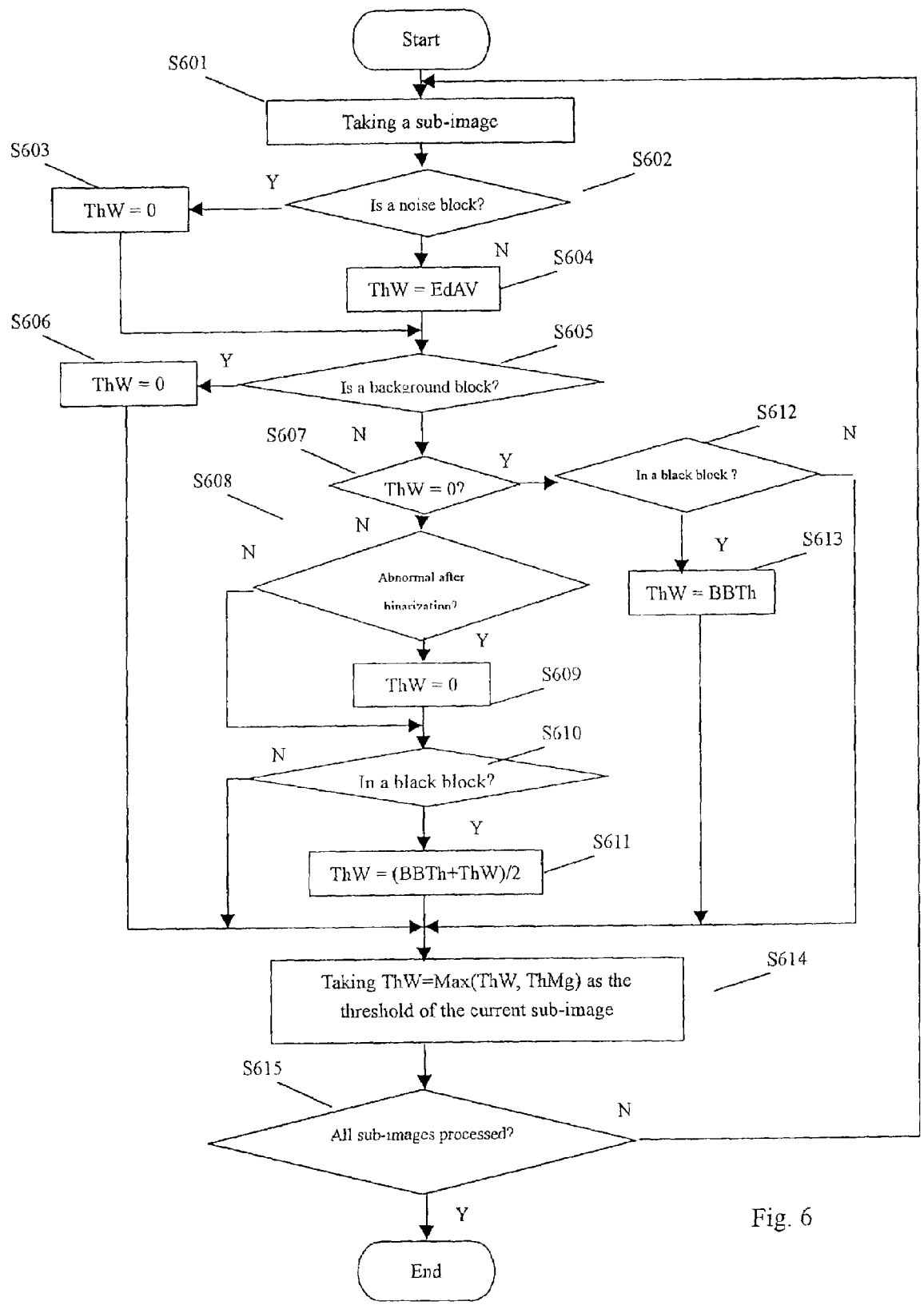
FIG. 6 is a flowchart showing the process for determining a threshold of a sub-image.

FIG. 6 is a flowchart for determining a threshold for a sub-image.

The process for determining a threshold for each sub-image of N×N pixels obtained by division after step S306 will be explained below with reference to FIG. 6.

Referring to FIG. 6, at step S601, a sub-image of N×N pixels divided in step S306 is sequentially selected, such as in the order of beginning from the upper left and proceeding from left to right and from top to bottom. Then the flow goes to step S602.

At step S602, it is determined whether the current sub-image is a noise block. The main criterion is checking whether the total number of edge pixels of the current sub-image is smaller than a predetermined value SP9. Where SP9 can be selected in the range from 4 to 15 and has a preferred value of 8.

If it is determined that the current sub-image is a noise block, the flow goes to step S603; otherwise the flow goes to step S604.

At step S603, since the current sub-image block is possibly a noise block, so the threshold ThW is assumed to be zero (0), and the flow goes to step S605.

At step S604, since the current sub-image block is not a noise block, so the threshold ThW is assumed to be equal to the average gray-level EdAV of the edge pixels of the current sub-image, and the flow goes to step S605.

At step S605, it is determined whether the current sub-image block is a background block. Explanation on a background block is given in the description relating to step S402. There are four main criterions:

(1) whether the original image contains a background block;

(2) whether the ratio of the total number of edge pixels in the current block to the total number of pixels of the current block is smaller than a parameter SP10;

(3) whether the difference between the average gray-level EdAV of the edge pixels in the current block and the average gray-level GAV of all pixels of the current block is smaller than a preset value SP11; and (4) whether the difference between the threshold ThW obtained in step S603 or step S604 and the position of the background peak found out in step S402 is smaller than a preset value SP12.

When all the above four conditions are satisfied, then the current sub-image block is determined as a background block.

In the above conditions, parameter SP10 is selected in the range of from 0.03 to 0.1 and has a preferred value of 0.06, parameter SP11 is selected in the range of from 10 to 30 and has a preferred value of 20; and parameter SP12 is selected in the range of from 10 to 45 and has a preferred value of 30.

In the original image 800A, a background block is found out in step S402, and the position of the background peak is 148, so condition (1) is satisfied. Then if the remaining three conditions are satisfied, then a current sub-image block can be regarded as a background block and the flow goes to step S606; otherwise the flow goes to step S607.

At step S606, as to original image 800A, as the current sub-image is determined as a background block, so ThW is set to be zero. Then the flow goes to step S614.

At step S607, it is determined whether ThW is zero during preceding process. If "YES", the flow goes to step S612; otherwise the flow goes to step S608.

At step S608, it is determined whether abnormality will occur if the current sub-image is binarized with ThW being the threshold. Two criterions may be used:

(1) whether the ratio of the total number of pixels each having a gray-level smaller than EdAV to the total number of pixels in the sub-image is greater than a parameter SP13; and (2) whether the average gray-level GAV of all the pixels in the current sub-image is greater than a pre-calculated global threshold SP14.

Where SP13 is a predetermined value selected from a range of 2 to 7 and has a preferred value of 5; SP14 is the global threshold of the original image to be processed (such as original image 800A) and can be obtained by calculation using a binarization method of the prior art, such as Otsu method, NiBlack method, minimum error method, or maximum entropy method, etc. For the exemplary example of original image 800A, Otsu method is used and a value of 167 is obtained.

If the above two criterions are all satisfied, meaning abnormality will occur if the current sub-image is binarized using ThW as threshold, the flow goes to step S609; otherwise the flow goes to step S610.

At step S609, as it has been determined in preceding step that abnormality will occur if the current sub-image block is binarized, so ThW is let to be zero, and the flow goes directly to step S610.

At step S610, it is determined whether the current sub-image is in a black block found out in step S303, by determining whether the center of the current sub-image block is in the area of a black block. If the condition is satisfied, then the current sub-image is determined as being in a black block, and the flow goes to step S611; otherwise the flow goes directly to step S614.

At step S611, the threshold ThW of the current sub-image is adjusted. As the current sub-image is in a black block, the effect of the black block needs to be taken in account. So the reference threshold BBTh calculated in step S302 is taken and it is let ThW=(BBTh+ThW)/2. Then the flow goes to step S614.

At step S612, as in step S610, it is determined whether the current sub-image falls in a black block found in step S303. The criterion of the determination is still whether the center of the current sub-image is in a black block.

In the example of original image 800A, as it has been known from the determination of step S607, the current sub-image has been determined as a noise block in a previous step and ThW has been set to zero. If the current sub-image is in a black block and the threshold is zero, then a white block will appear in the black block. Thus, it is necessary to determine in step S612 whether the current sub-image is in a black block. If the condition is met, then the current sub-image is determined as being in a black block, and the flow goes to step S613. Otherwise the flow directly goes to step S614.

At step S613, the threshold ThW of the current sub-image block is adjusted. Since the current sub-image block is in a black block, the effect of the black block needs to be considered. For this, the reference threshold BBTh calculated in step S302 is retrieved and ThW=BBTh is taken, then the flow goes to step S614.

At step S614, the threshold of the current sub-image block is finally decided. Based on the ThW calculated in each of steps S602 to S613 and the global minimum threshold ThMg obtained in step S304, the greater one of the two is taken as the final threshold of the current sub-image.

After step S614, the flow goes to step S614, where the main operation is to determine whether all the sub-images have been processed. If all the sub-images have been processed, the sub-image threshold determination process comes to an end; otherwise the flow returns to step S601.

Back to FIG. 3, after step S308, the flow goes to step S309, where the smoothing unit 209, based on the threshold of each of the sub-images determined in step S308, performs one-dimensional and two-dimensional interpolations, respectively and calculates a binarization threshold of each pixel in the original image, such as original image 800A.

Regarding the smoothing process of sub-image threshold, reference can be made to Japanese Patent Application Laid-Open NO. 9-233326, which proposes a smoothing method. In the smoothing method of Japanese Patent Application Laid-Open NO. 9-233326, the upper-left point of an original image (such as original image 800A) is taken as an origin; then a stripe with a width of N/2 pixels is divided at the uppermost side of the image, and then the original image is sequentially divided downwardly into stripes each having a width of N pixels; similarly, in the vertical direction, at first, a stripe having a width of N/2 pixels is divided at the leftmost side of the original image, and then the original image is sequentially divided rightward into stripes each having a width of N pixels. Thus, an original image is divided into sub-images of four categories: (1) a sub-image of N/2×N/2 pixels, in which the threshold of the upper-left block calculated in step S308 is taken as the threshold of each of all the pixels; (2) sub-images at the upper side of the original image, each of which has N/2×N pixels and in each of which a one-dimensional interpolation in the horizontal direction is used, with pixels along the vertical direction each having an equal threshold; (3) sub-images at the left side of the original image, each of which has N×N/2 pixels and in each of which a one-dimensional interpolation in the vertical direction is used, with pixels along the horizontal direction each having an equal threshold; and, (4) the remaining sub-image, each of which has N×N pixels and uses a two-dimensional interpolation.

In the present embodiment, the specific smoothing process is similar to that described in Japanese Patent Application Laid-Open NO. 9-233326, with the only exception that the size of the sub-images is different and that overall smoothing is performed without defining H1, H2, V1 and V2 as by letting H1=0, H2=N, V1=0 and V2=N.

After step S309, the flow goes to step S310, where binarization processing unit 210 performs a binarization process over the original image based on the threshold of each of the pixels of the original image as determined in Step S309; moreover, based on the characteristics of each of sub-images determined in step S308, for a non-noise sub-image block, the edge pixels found in step S306 are outputted as black dots in the obtained binarized image so as to generated the final binarization image of the original image. For original image 800A, a binarization image as shown in FIG. 8C is generated.

Thus, the process of the present embodiment is completed.

It is to be understood that while the present invention has been described with reference to a preferred embodiment and an exemplary image as shown in FIG. 8A, the present invention is not limited to this. And in the scope of the present invention, changes to the details can be made.

For example, the method for detecting black blocks in an original image is not limited to the method as described above, and other alternative methods can be used.

As a particular alternative method, first, the image can be divided into small blocks, such as each having 24×24 pixels, and each of the blocks is determined as to whether it is a black block. As a specific method for determining black blocks, a relatively small threshold can be chosen for the entire image, which threshold can be obtained using any well-known binarizing method, such as Otsu method. If, in one of the sub-blocks, the number of pixels, each of which has a gray-level smaller than the threshold, exceeds a preset number, then the sub-block is determined as a black block.

Then, area-connecting is performed for the sub-blocks each being determined as a black block, using any simple area-enlarging method, such as a mixed area-enlarging method (details of the mixed area-enlarging method can be found in Section 3.6,2 of "Image Analysis", by Wang, Runsheng, ISBN: 7-81024-3136, but pixels as the basic units to be connected are replaced by small black blocks in the present invention.) There are two main criterions for area-connecting: the first is the spatial closeness of the two portions to be determined as to whether they are an integral black block; the second is whether the internal features (such as the ratio of black pixels in each of the portions) of the two portions, which are to be determined as to whether they are an integral black block, have consistency. Finally, a chain table of the positions of all the black blocks in the image is obtained.

Moreover, determination of edge criterion is not limited to the method described above, and other method can be used, including edge criterion (determination threshold) determination methods known in the art.

It is to be noted that the present invention may be applied to either a system formed by a plurality of devices (e.g., a host computer, an interface device, a reader, a printer, a scanner, and the like), or an apparatus comprising a single equipment (e.g., a copying machine, a facsimile machine, or the like).

The objects of the present invention can also be achieved by supplying a storage medium storing program codes of a software program which can implement the functions of the above embodiments and reading out and executing the program codes stored in the storage medium using a computer (or a CPU or MPU) of the system or apparatus. In such a case, the program codes read out from the storage medium implement the functions of the above embodiments, and the storage medium storing the program codes constitutes the present invention.

As the storage medium for supplying the program codes, for example, a floppy disk, a hard disk, an optical disk, a magneto-optical disk, a CD-ROM, a CD-R, a magnetic tape, a nonvolatile memory, a ROM and the like, may be used.

The functions of the above embodiments may be implemented not only by executing the program codes by a computer but also by some or all of actual processing operations executed by an OS (operating system) running on a computer on the basis of an instruction of the program codes.

Moreover, the present invention also includes a situation where, after the program codes read from the storage medium are written in a function expansion card, which is inserted into a computer or in a memory provided in a function expansion unit connected to the computer, a CPU or the like contained in the function expansion card performs a part of or all the process in accordance with the commands of the program codes and realizes the functions of the above embodiment.

In a situation where the present invention is applied to the above storage medium, the storage medium stores program codes corresponding to the flowcharts (FIGS. 3, 4, 5 and 6) described in the description of the embodiments.

From above, it can be seen that the method of the present invention provides a method for effective binarizing a table image, which can determine a binarization threshold of a sub-image based on the gray-levels of edge pixels in the sub-image, so as to provide a more accurate, faster, and more effective image binarization process.

In addition, the present invention also provides an improved Sobel edge extracting method, which overcomes the shortcoming of conventional Sobel edge extracting methods that edge pixels are often displaced outward, thereby providing more clear extracted edge image.

This improved Sobel edge extracting method allows the positions of the extracted edge pixels to be closer to the positions of actual edge pixels, so the calculated gray-level of edge pixels in a sub-image is closer to real gray-level and the determined binarization threshold of the sub-image more accurately reflects the gray-level distribution of the sub-image, thus the binarization process of image is improved.

Also, the present invention provides a unique method for detecting black blocks in an image, providing more accurate, more effective and faster black block detection.

As many apparently widely different embodiments can be made without departing from the spirit and scope of the present invention, it is to be understood that the present invention is not limited to the specific embodiments and is defined only by the appended claims.

The invention claimed is:

1. An image processing method for processing an image with a gray-level distribution of pixels, comprising the steps of:
    calculating a statistical distribution of the gray-level of the pixels of said image;
    detecting edge pixels in the image in accordance with an edge criterion corresponding with the statistical distribution of gray-level;
    dividing said image into a plurality of sub-images;
    determining a binarizing threshold for each of the sub-images in accordance with the gray-levels of the edge pixels detected in the same sub-image; and
    binarizing each of the sub-images in accordance with the binarizing threshold determined for the same sub-image.

2. The image processing method of claim 1, further comprising the step of:
    determining a global minimum threshold for said image, wherein said global minimum threshold prevents the ratio of the number of pixels with gray-levels lower than said global minimum threshold to the total number of pixels in the image from becoming lower than a preset value;
    wherein the step of determining a binarizing threshold for each sub-image comprises:
    determining a candidate binarizing threshold of a current sub-image in accordance with the average gray-level of the edge pixels detected in the current sub-image;
    comparing said global minimum threshold with a second candidate binarizing threshold determined based on said candidate binarizing threshold of the current sub-image; and
    determining the binarizing threshold of the current sub-image on the basis of the result of said comparing step.

3. The image processing method of claim 2 further comprising the step of detecting a black block in the image.

4. The image processing method of claim 3, wherein, in said global minimum threshold determining step:
    if a black block is detected in said black block detecting step, said global minimum threshold is determined in accordance with a reference threshold of said black block; and
    if no black block is detected in said black block detecting step, said global minimum threshold is determined on the basis of said gray-level statistical distribution.

5. The image processing method of claim 4, further comprising the step of:
    determining said global minimum threshold on the basis of the positions of peaks and valleys in said gray-level statistical distribution.

6. The image processing method of claim 4, wherein determining said global minimum threshold on the basis of said gray-level statistical distribution comprises the step of:
    calculating the number of peaks in the gray-level statistical distribution.

7. The image processing method of claim 4, wherein said step of determining the binarizing threshold for each sub-image further comprises the step of:
    using the average value of the gray-levels of the edge pixels detected in said sub-image as said candidate binarizing threshold for the current sub-image.

8. The image processing method of claim 4, wherein said step of determining the binarizing threshold for each sub-image further comprises the steps of:
    determining whether the current sub-image is within a black block; and
    adjusting the binarizing threshold of the current sub-image in accordance with the reference threshold of the current black block if it is determined that the current sub-image is within a black block.

9. The image processing method of claim 4, wherein said step of determining the binarizing threshold for each sub-image further comprises the steps of:
    determining whether the current sub-image is a noise block; and
    if it is determined that the current sub-image is a noise block, allowing the binarizing threshold for the current sub-image to become independent to said candidate binarizing threshold for the current sub-image.

10. The image processing method of claim 7, wherein said step of determining the binarizing threshold for each sub-image further comprises the steps of:
    determining whether the current sub-image is a background block; and
    if it is determined that the current sub-image is a background block, allowing the binarizing threshold for the current sub-image to become independent to said candidate binarizing threshold for the current sub-image.

11. The image processing method of claim 4, wherein said step of determining the binarizing threshold for each sub-image further comprises the steps of:
    determining whether the current sub-image is a white block;
    if it is determined that the current sub-image is a white block, determining whether the current sub-image is within a black block; and
    if it is determined that the current sub-image is within a black block, adjusting the binarizing threshold of the current sub-image in accordance with the reference threshold of the black block.

12. The image processing method of claim 4, wherein said step of determining the binarizing threshold for each sub-image further comprises the steps of:
predicting whether the current sub-image will become abnormal after binarization; and
if it is predicted that the current sub-image will become abnormal after binarization, allowing the binarizing threshold for the current sub-image to become independent to said candidate binarizing threshold for the current sub-image.

13. The image processing method according to any one of claims 2 to 12, wherein the method further comprises the step of:
ensuring that the binarizing threshold of the current sub-image is equal to or larger than said global minimum threshold.

14. The image processing method according to any one of claims 1 to 12, wherein said edge pixel detecting step comprises:
calculating the magnitude of gradient of the gray-level distribution at a target pixel in the image;
determining the direction of said gradient;
comparing the calculated magnitude of gradient to said edge criterion; and
when said magnitude of gradient is larger than said edge criterion, setting a pixel near said target pixel as an edge pixel, wherein the direction from said target pixel to said pixel near the target pixel is the direction of the gradient at the target pixel.

15. The image processing method of claim 14, wherein said edge criterion is decided by the steps of:
analyzing said image in accordance with said statistical distribution of gray-level;
determining a dividing threshold for dividing said image into a foreground and a background in accordance with the result of said analyzing step; and
calculating said edge criterion based on the sum of gray-level of pixels of the foreground and the sum of gray-level of pixels of the background.

16. The image processing method of claim 15, wherein, in said analyzing step said image is classified, on the basis of said statistical distribution of gray-level, into one of the following image types:
a first image type in which the foreground and background is properly distributed;
a second image type in which the foreground is unclear; and
a third image type in which the background is unclear.

17. The image processing method according to any one of claims 3 to 12, wherein said black block detecting step comprises the steps of:
calculating the sum of gray-level of each line of pixels of the image, thereby obtaining a first sequence consisting of the sums for all the lines of pixels of the image;
calculating the sum of gray-level of each column of pixels of the image, thereby obtaining a second sequence consisting of the sums for all the columns of pixels of the image;
finding out extrema, if any, of the rate of variation in the first sequence and identifying the lines at which the extrema are located;
finding out extrema, if any, of the rate of variation in the second sequence and identifying the columns at which the extrema are located;
dividing the image with the lines and columns at which the extrema are located, thereby obtaining a plurality of divided image areas; and
determining whether the average gray-level of all the pixels in each of said divided image areas is lower than a preset black block discriminating threshold.

18. The image processing method of claim 17, further comprising the steps of:
determining whether any of the divided image areas is a broken-down area; and
when it is determined a divided image areas is a broken-down area, treating the divided image area as a non-black block.

19. The image processing method of claim 17, wherein said steps of finding out extrema of the rate of variation in the first and second sequences each comprises the steps of:
performing a convolution operation for the respective one of said sequences, thereby obtaining two new sequences;
determining whether the absolute value of each of the items in the two new sequences is greater than a predetermined value; and
recording the lines/columns at which the absolute value of the items in the new sequences being greater than said predetermined value as the lines/columns at which said extrema exist.

20. The image processing method according to any one of claims 3 to 12, further comprising the step of:
performing two-dimensional interpolating treatment for pixels in the current sub-image and the neighboring sub-images thereof with the binarizing thresholds of the current sub-image and the neighboring sub-images thereof.

21. A method for processing an image with a gray-level distribution, comprising the steps of:
calculating the magnitude of gradient of the gray-level distribution at a target pixel in the image;
determining the direction of said gradient;
comparing the calculated magnitude of gradient to a predetermined value; and
when said magnitude of gradient is larger than said predetermined value, setting a pixel near said target pixel as an edge pixel, wherein the direction from said target pixel to said pixel near the target pixel is the direction of the gradient at the target pixel,
wherein said predetermined value is decided by the steps of:
calculating a statistical distribution of gray-level of said image;
analyzing said image in accordance with said statistical distribution of gray-level;
determining a dividing threshold for dividing said image into a foreground and a background in accordance with the result of said analyzing step; and
calculating the said edge criterion based on the sum of gray-level of pixels of the foreground and the sum of gray-level of pixels of the background.

22. The method of claim 21, wherein said gradient is a discrete gradient.

23. The method of claim 21, wherein said gradient is calculated using Sobel filter.

24. The image processing method of claim 21, wherein, in said analyzing step, on the basis of said statistical distribution of gray-level, said image is classified as one of the following image types:
a first image type in which the foreground and background is properly distributed;

a second image type in which the foreground is unclear; and a third image type in which the background is unclear.

25. An image processing apparatus for processing an image having a gray-level distribution, comprising:
- a) a gray-level distribution calculating means for calculating a statistical distribution of the gray-level of the pixels of said image;
- b) an edge pixel detecting means for detecting edge pixels in the image in accordance with an edge criterion corresponding with the statistical distribution of gray-level;
- c) an image dividing means for dividing said image into a plurality of sub-images;
- d) a sub-image binarizing threshold determining means for determining a binarizing threshold for each of the sub-images in accordance with the gray-levels of the edge pixels detected in the same sub-image; and
- e) a binarizing means for binarizing each of the sub-image in accordance with the binarizing threshold determined for the same sub-image.

26. The image processing apparatus of claim 25, further comprising:
- f) a global minimum threshold determining means for determining a global minimum threshold for said image, said global minimum threshold prevents the ratio of the number of pixels with gray-levels lower than said global minimum threshold to the total number of pixels in the image from becoming lower than a preset value;
- wherein said sub-image binarizing threshold determining means,
- i) determines a candidate binarizing threshold of a current sub-image in accordance with the average gray-level of the edge pixels detected in the current sub-image;
- ii) compares said global minimum threshold with a second candidate binarizing threshold determined based on said candidate binarizing threshold of the current sub-image; and
- iii) determines the binarizing threshold of the current sub-image on the basis of the result of said comparing step.

27. The image processing apparatus of claim 26, further comprising means for detecting black block in the image.

28. The image processing apparatus of claim 27, wherein, said global minimum threshold determining means determines said global minimum threshold in accordance with a reference threshold of said black block when a black block is detected by said black block detecting means and determines said global minimum threshold on the basis of said gray-level statistical distribution when no black block is detected in said black block detecting means.

29. The image processing apparatus of claim 25, wherein said edge pixel detecting means comprises:
- an image classifying means for classifying said image in accordance with the calculated gray-level distribution;
- a dividing threshold determining means for determining a dividing threshold for dividing said image into a foreground and a background in accordance with the result of classification by said image classifying means; and
- edge criterion calculating means for calculating said edge criterion based on the sum of gray-level of pixels of the foreground and the sum of gray-level of pixels of the background.

30. A computer-readable storage medium on which are stored computer-readable program codes for an image processing method for processing an image with a gray-level distribution of pixels, said program codes comprising:
- a) code for calculating a statistical distribution of the gray-level of the pixels of said image;
- b) code for detecting edge pixels in the image in accordance with an edge criterion corresponding with the statistical distribution of gray-level;
- c) code for dividing said image into a plurality of sub-images;
- d) code for determining a binarizing threshold for each of the sub-images in accordance with the gray-levels of the edge pixels detected in the same sub-image; and
- e) code for binarizing each of the sub-image in accordance with the binarizing threshold determined for the same sub-image.

31. The computer-readable storage medium of claim 30, wherein said program code further comprises:
- code for determining a global minimum threshold for said image, said global minimum threshold prevents the ratio of the number of pixels with gray-levels lower than said global minimum threshold to the total number of pixels in the image from becoming lower than a preset value;
- wherein the code determining a binarizing threshold for each sub-image comprises:
- code for determining a candidate binarizing threshold of a current sub-image in accordance with the average gray-level of the edge pixels detected in the current sub-image;
- code for comparing said global minimum threshold with a second candidate binarizing threshold determined based on said candidate binarizing threshold of the current sub-image; and
- code for determining the binarizing threshold of the current sub-image on the basis of the result of said comparing step.

32. The computer-readable storage medium of claim 30, wherein said program code further comprises code for detecting black block in the image.

33. The computer-readable storage medium of claim 32, wherein the code for determining said global minimum threshold is for causing the following process:
- when a black block is detected in the image by said code for detecting black block, determining said global minimum threshold in accordance with a reference threshold of said black block; and
- when no black block is detected by said code for detecting black block, determining said global minimum threshold on the basis of said gray-level statistical distribution.

* * * * *

UNITED STATES PATENT AND TRADEMARK OFFICE
CERTIFICATE OF CORRECTION

PATENT NO. : 7,062,099 B2
APPLICATION NO. : 10/194263
DATED : June 13, 2006
INVENTOR(S) : Yulin Li et al.

It is certified that error appears in the above-identified patent and that said Letters Patent is hereby corrected as shown below:

TITLE PAGE:
(57) ABSTRACT
Line 4, "an" should read -- a --; and
Line 6, "sub-image." should read -- sub-images. --.

COLUMN 1:
Line 20, "an" should be deleted;
Line 30, "systems," should read -- Systems, --; and
Line 31, "cybernetics," should read -- Cybernetics, --.

COLUMN 2:
Line 1, "be led" should read -- lead --.

COLUMN 4:
Line 32, "sub-image" should read -- sub-images --.

COLUMN 8:
Line 31, "an" should read -- and --.

COLUMN 9:
Line 2, "criterions" should read -- criteria --.

COLUMN 17:
Lines 51 and 55, "of" (first occurrence) should be deleted.

COLUMN 18:
Line 11, "manner" should read -- manners --; and
Line 23, "large" should read -- larger --.

COLUMN 19:
Line 39, "criterions:" should read -- criteria --.

COLUMN 20:
Line 26, "criterions" should read -- criteria --.

COLUMN 22:
Line 23, "criterions" should read -- criteria --.

COLUMN 25:
Line 47, "is" should read -- are --.

UNITED STATES PATENT AND TRADEMARK OFFICE
CERTIFICATE OF CORRECTION

PATENT NO. : 7,062,099 B2
APPLICATION NO. : 10/194263
DATED : June 13, 2006
INVENTOR(S) : Yulin Li et al.

It is certified that error appears in the above-identified patent and that said Letters Patent is hereby corrected as shown below:

COLUMN 26:
Line 11, "areas" should read -- area --; and
Line 24, "being" should read -- are --.

COLUMN 27:
Line 19, "sub-image" should read -- sub-images --; and
Line 26, "prevents" should read -- preventing --.

COLUMN 28:
Line 19, "sub-image" should read -- sub-images --; and
Line 26, "prevents" should read -- preventing --.

Signed and Sealed this

Thirty-first Day of July, 2007

JON W. DUDAS
*Director of the United States Patent and Trademark Office*